United States Patent
Baba

(10) Patent No.: US 9,152,891 B2
(45) Date of Patent: Oct. 6, 2015

(54) IMAGE PROCESSING APPARATUS CREATING IMAGE DATA WITH SAME DIRECTION

(71) Applicant: Kyocera Document Solutions Inc., Osaka (JP)

(72) Inventor: Masaki Baba, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/324,142

(22) Filed: Jul. 4, 2014

(65) Prior Publication Data
US 2015/0009515 A1 Jan. 8, 2015

(30) Foreign Application Priority Data

Jul. 4, 2013 (JP) .................................. 2013-140467
Jul. 4, 2013 (JP) .................................. 2013-140468
Jul. 4, 2013 (JP) .................................. 2013-140469
Jul. 4, 2013 (JP) .................................. 2013-140470

(51) Int. Cl.
*G06F 15/00* (2006.01)
*G06K 15/16* (2006.01)
*B65H 7/20* (2006.01)
*H04N 1/387* (2006.01)

(52) U.S. Cl.
CPC *G06K 15/16* (2013.01); *B65H 7/20* (2013.01); *H04N 1/387* (2013.01)

(58) Field of Classification Search
None
See application file for complete search history.

(56) References Cited

U.S. PATENT DOCUMENTS

| | | | |
|---|---|---|---|
| 6,546,215 B2* | 4/2003 | Machida | 399/82 |
| 2013/0003149 A1* | 1/2013 | Murakami | 358/518 |
| 2013/0070273 A1* | 3/2013 | Nagata | 358/1.13 |
| 2014/0009778 A1* | 1/2014 | Hanano | 358/1.13 |
| 2015/0015917 A1* | 1/2015 | Hirohata et al. | 358/3.24 |

FOREIGN PATENT DOCUMENTS

| | | |
|---|---|---|
| JP | H06-103410 A | 4/1994 |
| JP | H06-225053 A | 8/1994 |
| JP | H11-120321 A | 4/1999 |
| JP | 2003-110829 A | 4/2003 |

* cited by examiner

*Primary Examiner* — Helen Q Zong
(74) *Attorney, Agent, or Firm* — James W. Judge

(57) ABSTRACT

An image processing apparatus includes a document feeding unit, a document reading unit, a first set-document direction accepting key, an automatic determination mode setting accepting key, a set-document direction determining unit, and an image processor. The set-document direction determining unit is configured to determine, on a per-page basis, a set-document direction of documents set on the document feeding unit, based on original image data read by the document reading unit. The image processor is configured to perform a rotation process on original image data read by the document reading unit, based on the determination result by the set-document direction determining unit, and to perform a rotation process based on the first set-document direction accepted by the first set-document direction accepting key for a page for which the determination by the set document direction determining unit fails.

14 Claims, 23 Drawing Sheets

IMAGE PROCESSING APPARATUS CREATING IMAGE DATA WITH SAME DIRECTION

INCORPORATION BY REFERENCE

This application relates to and claims priority from Japanese Patent Application Nos. 2013-140467, 2013-140468, 2013-140469, 2013-140470, each filed in the Japan Patent Office on Jul. 4, 2013, the entire disclosure of which are incorporated herein by reference.

BACKGROUND

Unless otherwise indicated herein, the description in this section is not prior art to the claims in this application and is not admitted to be prior art by inclusion in this section.

Since directions of upper edges of a bundle of documents set at a document feeding unit are not always aligned, the following technique has been proposed. The technique automatically determines set document directions of respective pages based on read original image data. Based on the determination result, the technique performs a rotation process on the original image data on the respective pages as necessary to automatically align upper edges of the original image data upward.

The determination process of set document direction is generally performed based on characters itself, which have directionality, and a layout with page number notation or similar. If the bundle of documents includes a document that includes only a photograph or an illustration or a blank document, the set document direction is failed to be determined or results in erroneous determination. Accordingly, the document that includes only a photograph or an illustration may have a different upper edge from other pages. For example, as illustrated in FIG. 16, if the third page is a document that includes only a photograph or an illustration and therefore the set document direction is failed to be determined or results in erroneous determination, the rotation process possibly rotates the document in any direction. The possibility of rotation in correct direction is around one-quarter.

Therefore, if the set document direction is failed to be determined, there has been proposed a technique that determines the set document direction with reference to a back surface. Alternatively, there has been proposed a technique that determines only a set document direction of a first page, and the technique performs the rotation process same as the rotation process of the first page on original image data on all pages based on the determination result.

However, determining the set document direction with reference to the back surface is effective to a document whose front and back surfaces are mistakenly set or a duplex printed document. However, there is a problem that such technique cannot handle a document where only a photograph or an illustration is printed on one surface.

Assume that the rotation process same as the rotation process of the first page is performed on the original image data on all pages based on the determination result of the first page. If directions of images on some pages differ from images on other pages among the bundle of documents, there is a problem that only these some pages have upper edges different from other pages. For example, as illustrated in FIG. 17, assume that the set document direction on the fourth page has an upper-edge at back and therefore differs from an upper-edge at left, which is the set document direction of the first page. Then, the original image data on the fourth page is rotated right by 90 degree same as the rotation of the first page, thus setting a different upper edge only to the original image data on the fourth page.

SUMMARY

An image processing apparatus according to the disclosure includes a document feeding unit, a document reading unit, a first set document direction accepting key, an automatic determination mode setting accepting key, a set document direction determining unit, and an image processor. The document feeding unit is configured to sequentially convey set documents. The document reading unit is configured to read a document image of a document conveyed by the document feeding unit. The first set document direction accepting key is configured to accept setting of a first set document direction of a document set at the document feeding unit. The automatic determination mode setting accepting key is configured to accept setting of whether to perform automatic determination of a set document direction or not. The set document direction determining unit is configured to determine a set document direction of documents set to the document feeding unit for each page based on original image data read by the document reading unit. The image processor is configured to perform a rotation process on original image data read by the document reading unit. The image processor is configured to: perform a rotation process on original image data based on the determination result by the set document direction determining unit, and perform a rotation process based on the first set document direction accepted by the first set document direction accepting key for a page to which the determination by the set document direction determining unit is failed.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
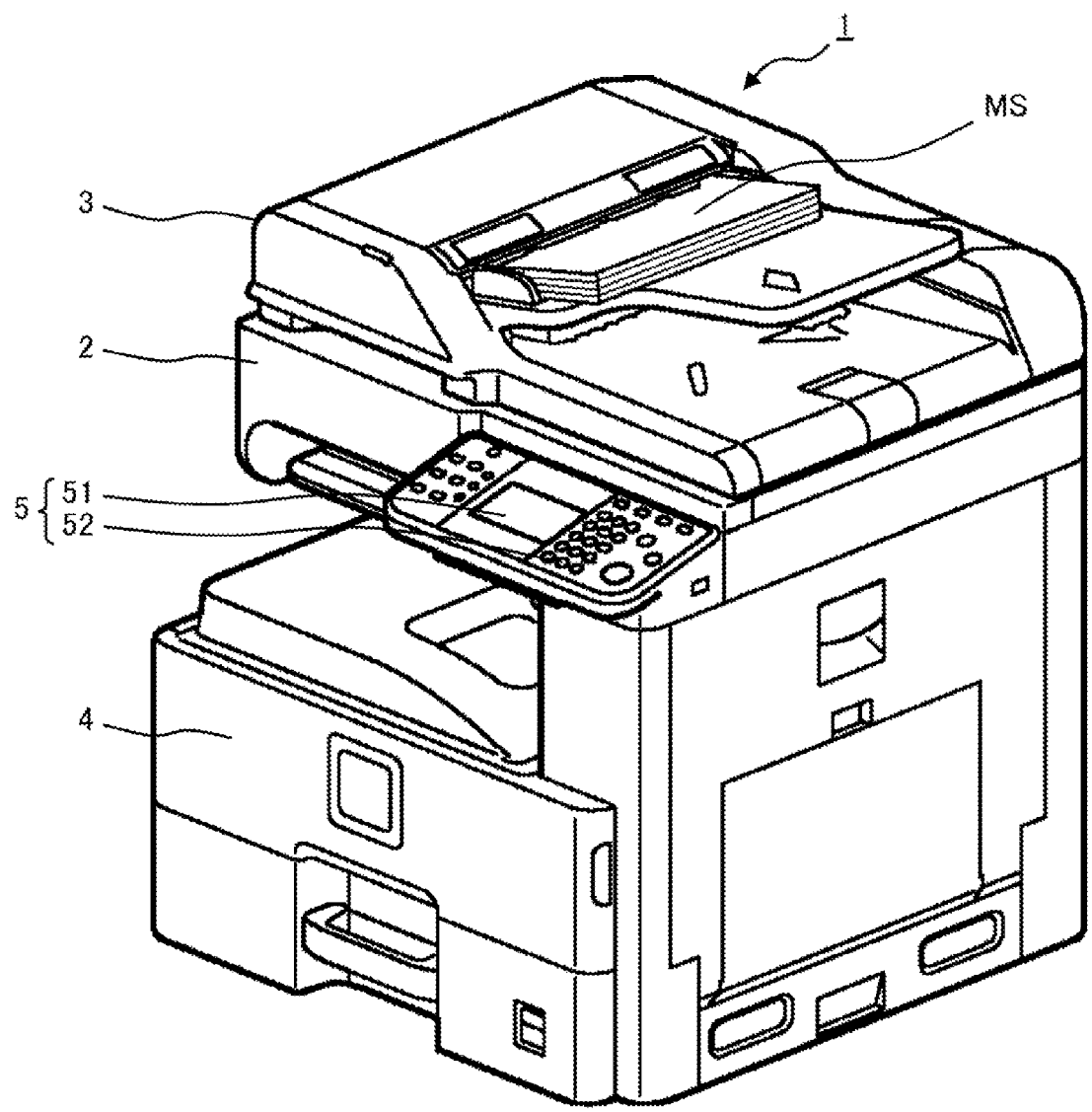
FIG. 1 illustrates a constitution of an image forming apparatus according to an embodiment the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following specifically describes embodiments of the disclosure with reference to the drawings. An image forming apparatus 1 according to an embodiment is an apparatus that forms images of a copier, a scanner, a multi-functional peripheral, or a similar device. With reference to FIG. 1, the image forming apparatus 1 includes a document reading unit 2, a document feeding unit 3, a main unit 4, and an operation unit 5.

The document reading unit 2 is arranged at an upper portion of the main unit 4.

The document feeding unit 3 is arranged at an upper portion of the document reading unit 2.

At a front side of the image forming apparatus 1, the operation unit 5 is arranged. On the operation unit 5, settings of the image forming apparatus 1 and operation instructions are conducted. The operation unit 5 includes a liquid crystal display unit 51 and an operation key 52. A user input instructions by operating the operation unit 5 to configure various settings of the image forming apparatus 1, thus causing the image forming apparatus 1 to perform various functions such as image formation. On the liquid crystal display unit 51, various settings can be configured including: indication of a state of the image forming apparatus 1, indication of an image formation condition and the number of print copies, and as a touch panel, functions such as duplex printing and black-and-white inversion, magnification setting, print density setting, or a similar function. The operation key 52 includes a start key, a stop/clear key, a reset key, a numeric keypad, or a similar key. With the start key, the user instructs a start of image formation. The stop/clear key is used for aborting the image formation or for a similar case. The reset key is used for defaulting various settings of the image forming apparatus 1.

Figure 2:
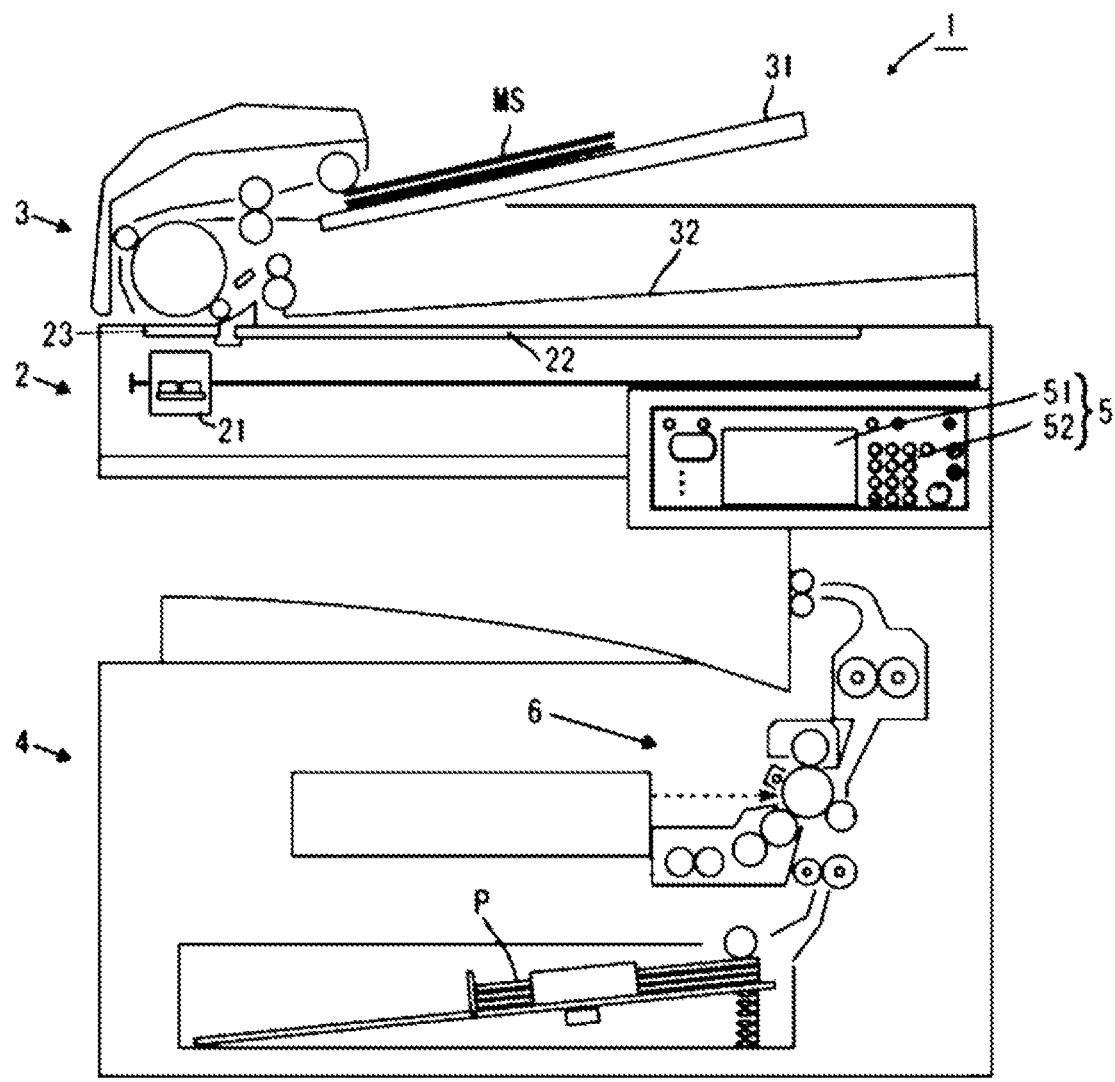
FIG. 2 illustrates an internal constitution of the image forming apparatus according to the embodiment.

With reference to FIG. 2, the document reading unit 2 includes a scanner 21, a platen glass 22, and a document reading slit 23. The scanner 21 includes a light source using a Light Emitting Diode (LED) and a light receiving portion 25 constituted of a charge coupled device (CCD) line sensor. The scanner 21 is movable to a direction of documents MS conveyed by the document feeding unit 3. The document reading slit 23 is a slit formed perpendicular to the direction of the document MS conveyed by the document feeding unit 3.

The document feeding unit 3 includes a document placing portion 31, a document discharging unit 32, and a document conveying mechanism 33. The document conveying mechanism 33 sequentially feeds the documents MS set on the document placing portion 31 one by one. The documents MS are conveyed to the position facing the document reading slit 23, and then are discharged to the document discharging unit 32. The document feeding unit 3 and the document reading unit 2 are connected with a hinge mechanism at a back side of the image forming apparatus 1. The document feeding unit 3 functions as a platen cover that opens and closes a top surface of the platen glass 22. Opening the document feeding unit 3 upward releases the top surface of the platen glass 22, allowing the document MS to be set on the platen glass 22.

With the document MS set at the document placing portion 31, when reading of the document MS is instructed with the operation key 52 of the operation unit 5, the document feeding unit 3 reads the document MS to be conveyed. The document MS is set at the document placing portion 31 with its surface (surface from which a document image is read) up. Then, the document feeding unit 3 conveys the document MS set at the document placing portion 31 from a left side. The surface of the document MS is led to a position facing the document reading slit 23.

To read documents MS conveyed by the document feeding unit 3, the scanner 21 moves to the position facing the document reading slit 23. Then, the scanner 21 reads the documents MS via the document reading slit 23 synchronizing a conveying operation of the documents MS by the document feeding unit 3, obtains image data, and outputs the obtained image data to the main unit 4.

The main unit 4 includes a recording unit 6. The main unit 4 forms a toner image based on the obtained image data on a fed paper sheet P.

Figure 3:
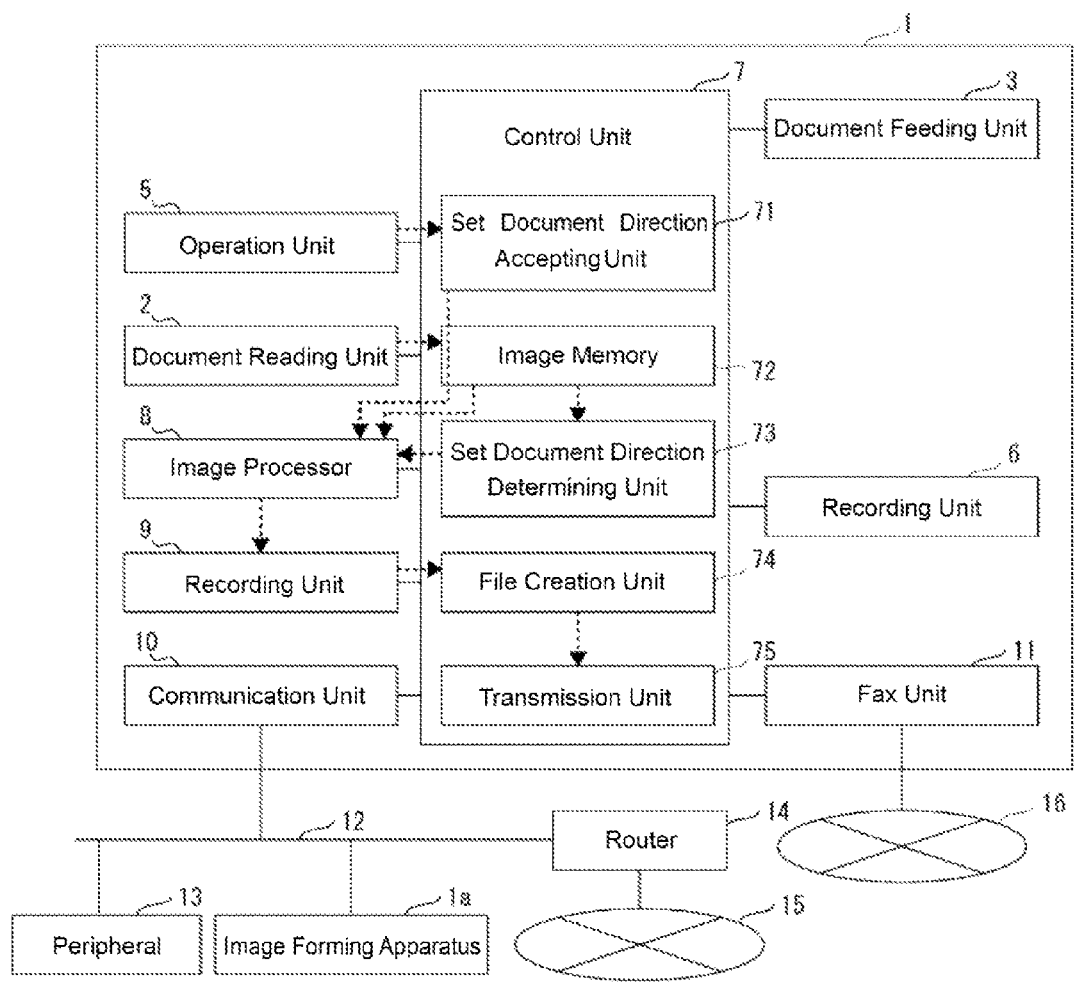
FIG. 3 illustrates a schematic configuration of the image forming apparatus according to the embodiment.

FIG. 3 illustrates a schematic configuration of the image forming apparatus 1. The above-described document reading unit 2, document feeding unit 3, operation unit 5, and recording unit 6 are connected to a control unit 7 and are operated and controlled by the control unit 7. To the control unit 7, an image processor 8, a storage unit 9, a communication unit 10, and a fax unit 11 are connected.

The control unit 7 is an information processing unit such as a microcomputer that includes a Read Only Memory (ROM), a Random Access Memory (RAM), or a similar memory. The ROM stores a control program for operating and controlling the image forming apparatus 1. The control unit 7 reads the control program stored in the ROM and loads the control program to the RAM. Thus, the control unit 7 controls the entire apparatus according to predetermined instruction information input from the operation unit 5.

The image processor 8 is a unit that performs a predetermined image process on image data. For example, the image processor 8 performs image improvement processing such as a rotation process, an enlargement/reduction processing, gradation adjustment, and print density adjustment.

The storage unit 9 is a storage unit such as a semiconductor memory and a Hard Disk Drive (HDD). The storage unit 9 stores the image data obtained by reading the document MS by the document reading unit 2 and also stores various management information.

The communication unit 10 has a function to transmit/receive various data to/from a peripheral 13 such as a personal computer and another image forming apparatus 1a via a network 12 such as LAN. The communication unit 10 is connectable to an Internet 15 via the network 12 and a router 14. The communication unit 10 has a function to transmit/receive various data to/from various communications devices connected to the Internet 15.

The fax unit 11 includes a modem. The fax unit 11 includes a facsimile transmission function and a facsimile reception function. The fax unit 11 generates a facsimile signal from an image file read by the document reading unit 2 and filed. The facsimile transmission function transmits the generated facsimile signal via a network such as a telephone network 16. The facsimile reception function receives the facsimile signal via the telephone network 16 and generates the image file from the received facsimile signal. The image file received and generated by the facsimile reception function is stored in the storage unit 9 and/or is recorded to a recording sheet P by the recording unit 6.

First Embodiment

Next, the following describes a set document direction correction operation according to a first embodiment in the image forming apparatus 1 in detail with reference to FIGS. 4A to 4E and FIG. 6.

The image forming apparatus 1 according to the embodiment has a set document direction correction function. When reading the plurality of documents MS set at the document placing portion 31, the set document direction correction function automatically aligns upper edges of the documents MS upward.

Figure 4A:
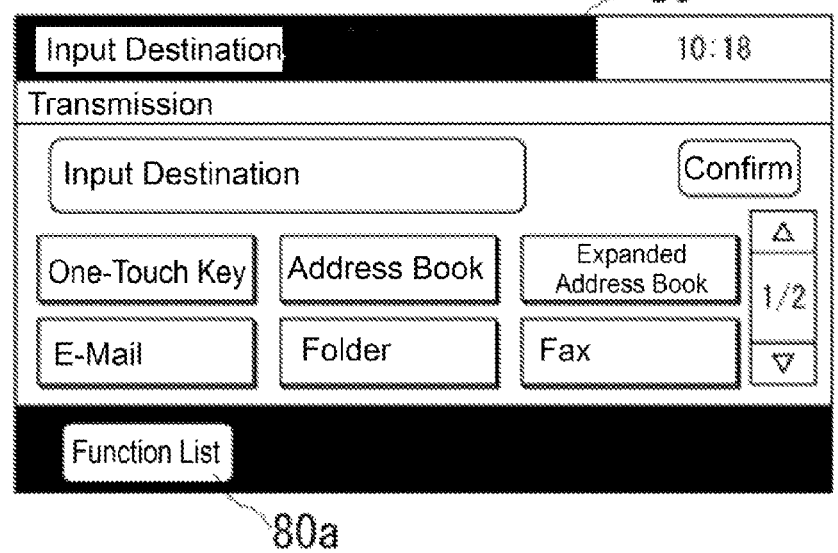
FIGS. 4A to 4E illustrate setting screen examples displayed on a liquid crystal display unit of an operation unit apparatus according to the embodiment.
Figure 4B:
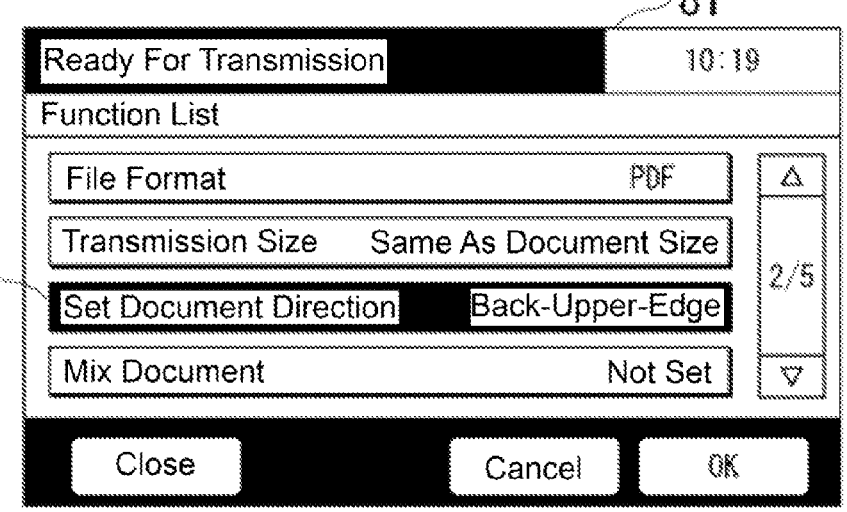

When a user sets the documents MS at the document placing portion 31 of the document feeding unit 3 and instructs reading document images with the operation unit 5, the control unit 7 causes the liquid crystal display unit 51 to display a transmission destination setting screen 80, which is illustrated in FIG. 4A, and accepts a transmission destination setting. The transmission destination setting screen 80 includes a function list key 80a. By operation of the function list key 80a, the control unit 7 causes the liquid crystal display unit 51 to display a function list screen 81, which is illustrated in FIG. 4B. The function list screen 81 is a screen for accepting selection of set function. The function list screen 81 includes a set document direction key 81a.

Figure 4C:
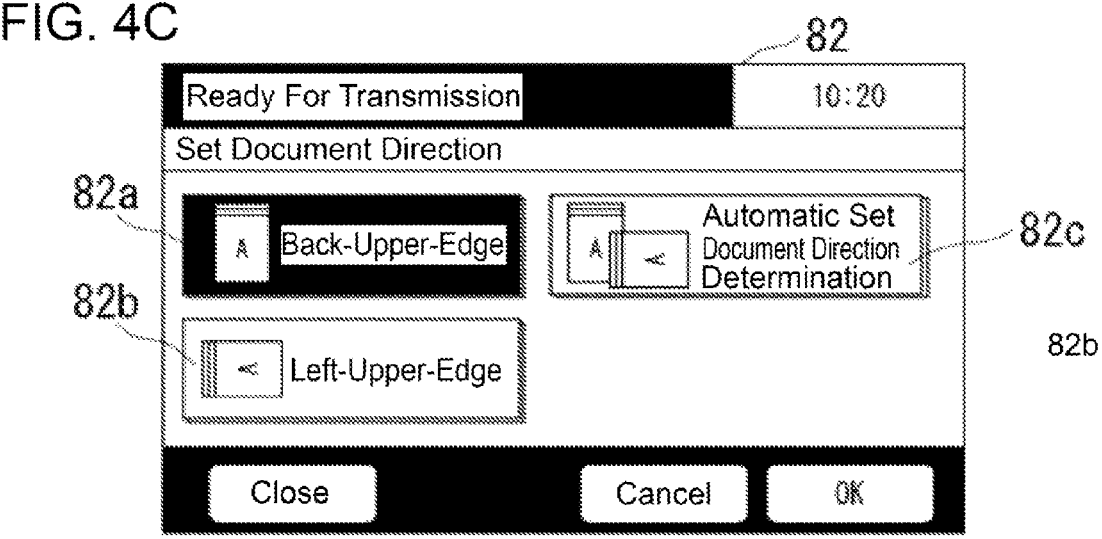
Figure 4D:
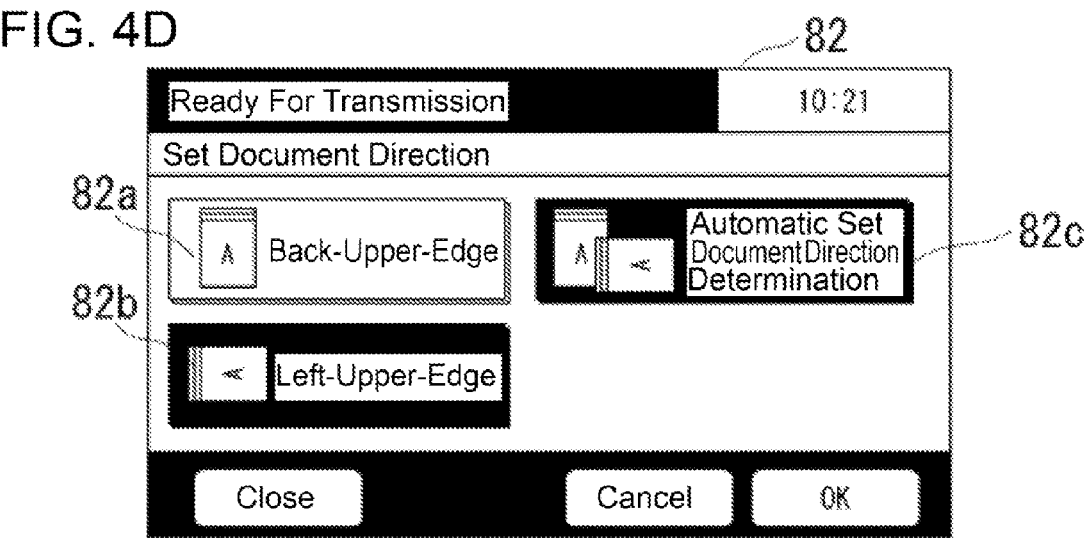

By operation of the set document direction key 81a, the control unit 7 causes the liquid crystal display unit 51 to display a set document direction setting screen 82, which is illustrated in FIGS. 4C and 4D. The set document direction setting screen 82 includes a back direction setting key 82a and a left direction setting key 82b. The back direction setting key 82a sets the upper edges to the back direction as the set document direction, which is for setting any one of the set document directions of two directions perpendicular to one another. The left direction setting key 82b sets the upper edges to the left direction as the set document direction. The control unit 7 functions as a set document direction accepting unit 71 and accepts the setting of the set document direction (Step 101). The set document direction setting screen 82 also includes an automatic determination mode setting key 82c that sets whether to automatically determine the set document direction or not. The control unit 7 functions as the set document direction accepting unit 71. The control unit 7 accepts the setting of whether to automatically determine the set document direction or not by turning on or off the automatic determination mode setting key 82c (Step 102).

Figure 4E:
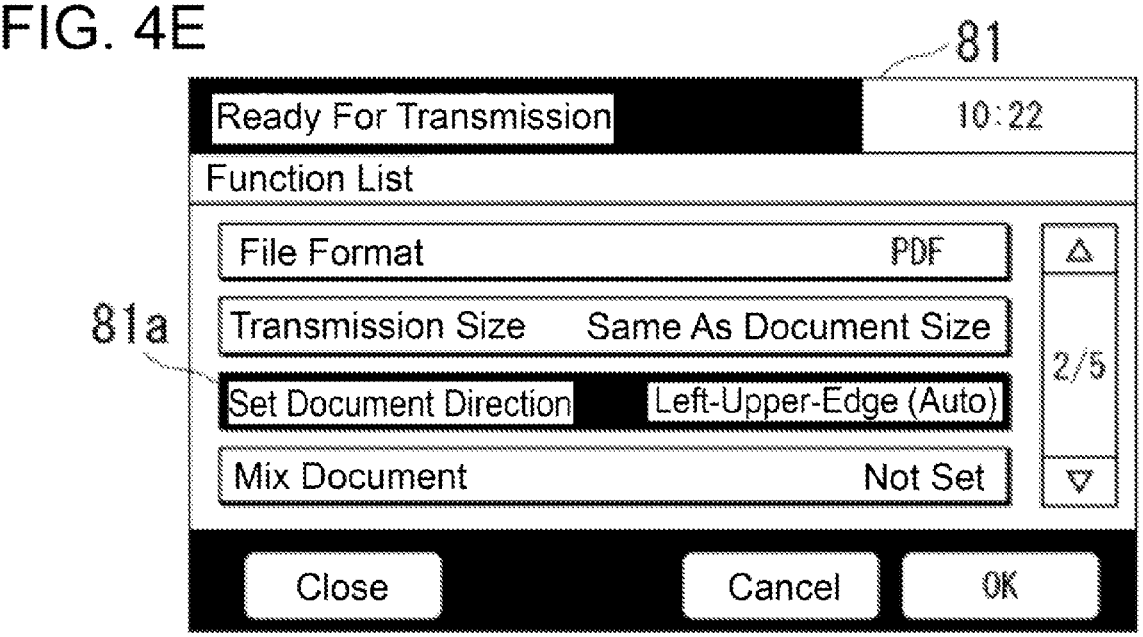

FIG. 4C illustrates a state where the set document direction is selected so that the upper edge is in the back direction using the back direction setting key 82a. FIG. 4D illustrates a state where the automatic determination of the set document direction is selected "ON" with the automatic determination mode setting key 82c and the set document direction is selected so that the upper edge is in the left direction using the left direction setting key 82b. Thus, both of the instruction key for the set document direction and the key for the automatic set document direction determination can be simultaneously selected. Further, FIG. 4E illustrates a state where an "OK" key is operated at the set document direction setting screen 82, the set document direction is set to the automatic determination using the automatic determination mode setting key 82c, and the set document direction is set so that the upper edge is in the left direction using the left direction setting key 82b.

Next, the control unit 7 monitors the operation of the start key (Step 103). When the start key is operated, first, the document feeding unit 3 feeds and conveys the first document MS (Step 104). Then, the document reading unit 2 reads the document MS to obtain original image data. The control unit 7 causes the RAM to function as an image memory 72 to store the obtained original image data (Step 105).

Next, the control unit 7 functions as a set document direction determining unit 73. The control unit 7 performs a set document direction determination process based on the original image data stored in the image memory 72 (Step 106).

The determination process by the set document direction determining unit 73 at Step 107, for example, performs OCR processes on the respective original image data with no rotation and rotated by 90 degree, 180 degree, and 270 degree. Then, the set document direction determining unit 73 calculates recognition ratios in the respective directions. If the recognition ratios are less than predetermined values in all directions, the set document direction determining unit 73 determines that the determination is failed. If the recognition ratio is equal to or more than the predetermined value in any of equal to or more than one direction, the direction with the highest recognition ratio is determined as the set document direction.

This embodiment is configured such that any of settings of the set document direction of two directions perpendicular to one another (upper-edge at back, upper-edge at left) is accepted at the set document direction setting screen 82. This embodiment assumes that the set document direction of the document MS with respect to the document placing portion 31 of the document feeding unit 3 is any one of the two directions perpendicular to one another (upper-edge at back, upper-edge at left).

Accordingly, the determination process by the set document direction determining unit 73 also performs the OCR process only on the assumed two directions (upper-edge at back, upper-edge at left) and then the set document direction is determined. This reduces a work load taken for the determination process; and therefore is preferable.

Next, the set document direction determining unit 73 determines whether the set document direction is successfully determined or not (Step 107).

When the set document direction is successfully determined at Step 107, the set document direction determining unit 73 instructs the rotation process based on the determination result to the image processor 8. Then, the image processor 8 performs the rotation process based on the determination result by the set document direction determining unit 73 (Step 108).

Figure 6:
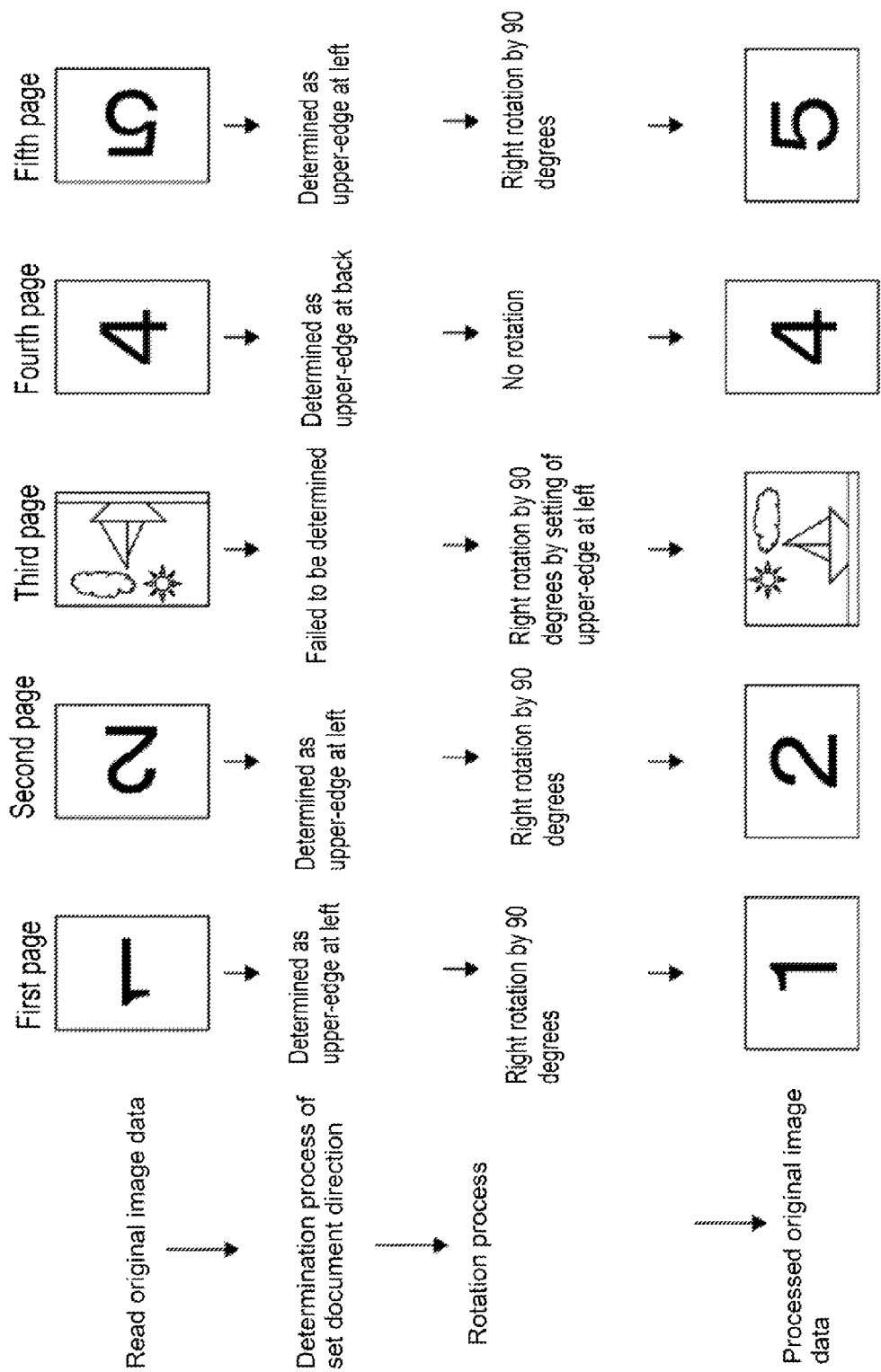
FIG. 6 illustrates the set document direction correction operation according to the first embodiment in the image forming apparatus.

For example, like the first page, the second, and the fifth pages illustrated in FIG. 6, if the determination result by the set document direction determination process is determined as upper-edge at left, the rotation process at Step 108 rotates the original image data by 90 degree right. Like the fourth page illustrated in FIG. 6, if the determination result by the set document direction determination process is determined as upper-edge at back, since the direction matches the read set document direction, the rotation process is not performed at Step 108.

On the other hand, if the set document direction is failed to be determined at Step 107, the set document direction determining unit 73 instructs the rotation process based on the setting of the set document direction accepted at Step 101 to the image processor 8. Then, the image processor 8 performs the rotation process based on the set document direction accepted at Step 101 (Step 110).

For example, when the left direction setting of the upper edge is accepted at Step 101, like the third page illustrated in FIG. 6, the rotation process at Step 110 rotates the original image data by 90 degree right.

When the back direction setting of the upper edge is accepted at Step 101, since the direction matches the read set document direction, the rotation process is not performed at Step 110. Then, the storage unit 9 saves the rotation-processed original image data (Step 109).

Next, the control unit 7 determines whether the subsequent document MS is present or not (Step 111). When the subsequent document MS is present, the process returns to Step 104 and the control unit 7 causes the document feeding unit 3 to feed and convey the subsequent document MS.

When the subsequent document MS is not present at Step 111, the control unit 7 functions as a file creation unit 74. The file creation unit 74 creates an image file from the original image data on all pages stored in the storage unit 9 at Step 109 (Step 112).

Figure 5:
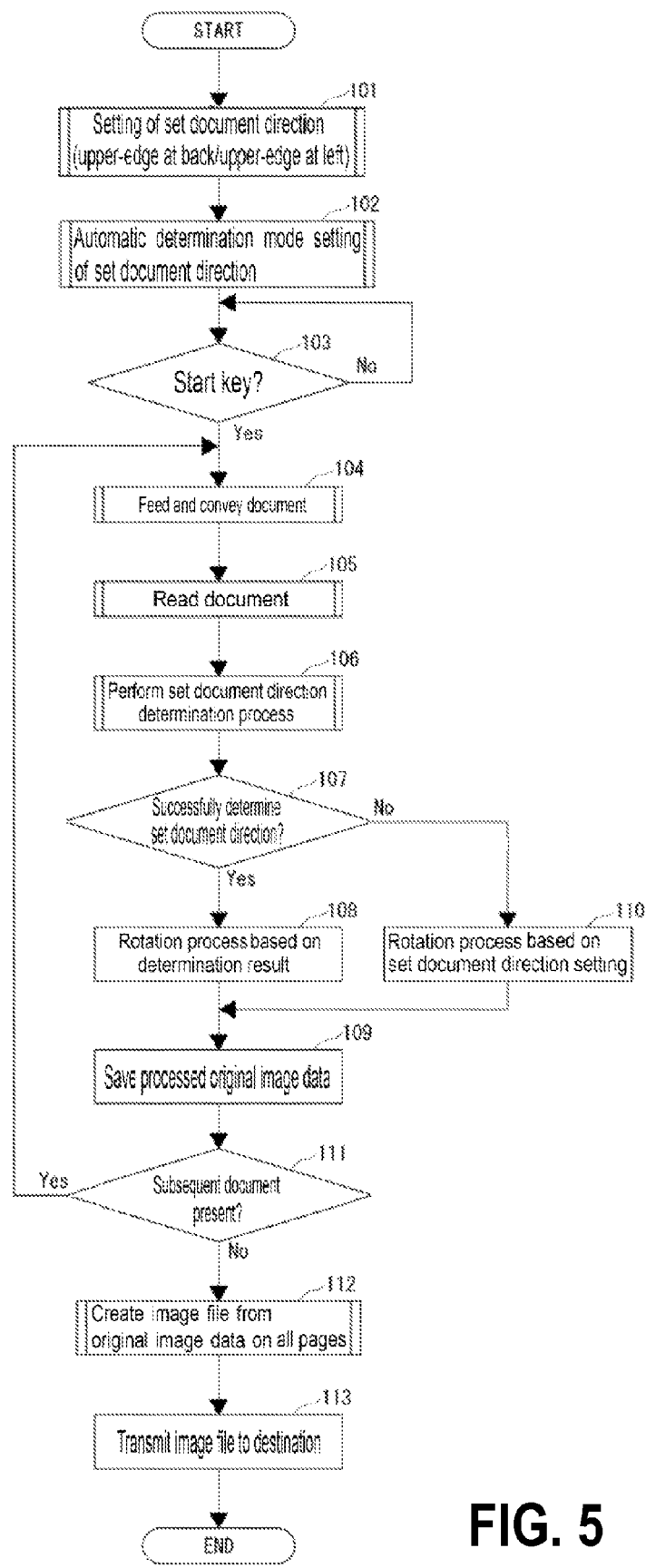
FIG. 5 illustrates a set document direction correction according to a first embodiment operation in the image forming apparatus.

Then, the control unit 7 functions as a transmission unit 75. The transmission unit 75 transmits the image file created at Step 121 to a transmission destination accepted at the transmission destination setting screen 80 illustrated in FIG. 5A (Step 113), and the process is completed.

As described above, in the first embodiment, the image forming apparatus 1 includes the document feeding unit 3, the document reading unit 2, the set document direction accepting unit 71, the set document direction determining unit 73, and the image processor 8. The document feeding unit 3 is configured to sequentially convey the set documents MS. The document reading unit 2 is configured to read a document image of the document MS conveyed by the document feeding unit 3. The set document direction accepting unit 71 is configured to accept setting of a set document direction of the documents MS set at the document feeding unit 3. The set document direction determining unit 73 is configured to determine a set document direction of the documents MS set to the document feeding unit 3 based on original image data read by the document reading unit 2. The image processor 8 is configured to perform a rotation process on original image data read by the document reading unit 2. The image processor 8 is configured to perform a rotation process on original image data based on a determination result by the set document direction determining unit 73. When determination by the set document direction determining unit 73 fails, the image processor 8 is configured to perform a rotation process based on a set document direction accepted by the set document direction accepting unit 71.

This configuration ensures determining the set document direction while preliminary setting the set document direction due to a photograph, a blank sheet, or a similar document. Thus, even documents to which the set document direction is failed to be determined, the upper edges of the documents can be correctly aligned. That is, considering a general bundle of documents with a plurality of pages, the upper edges of most pages (photograph pages) have the same direction. The upper edges of some pages often have different directions from other pages.

Originally, it rarely happens that the upper edges of the bundle of documents are in four different directions or a similar case. Therefore, the disclosure ensures creating the image files with the upper edges of images read from the bundle of documents aligned. In particular, the disclosure is suitable for the bundle of documents that includes some pages of character documents with different image direction while including a photograph image with the same direction as the direction of most pages.

Furthermore, in the first embodiment, the set document direction accepting unit 71 is configured to accept setting of any one of set document directions of two directions (upper-edge at back, upper-edge at left). The set document direction determining unit 73 is configured to determine a set document direction (upper-edge at back, upper-edge at left) whose setting is accepted by the set document direction accepting unit 71. This configuration ensures reducing the work load taken for the set document direction determination process.

Second Embodiment

Figure 7:
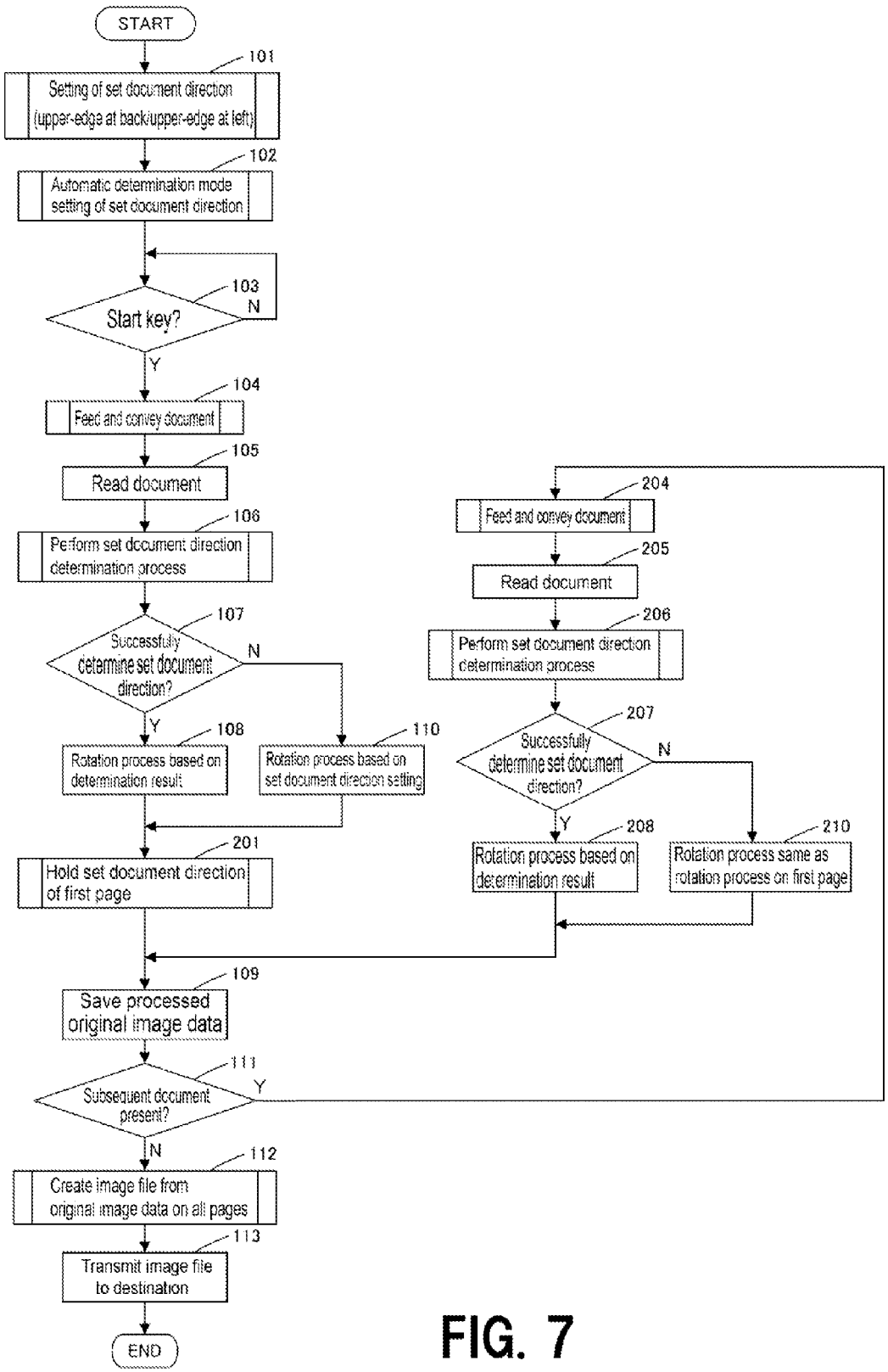
FIG. 7 illustrates a set document direction correction operation according to a second embodiment in the image forming apparatus.
Figure 8:
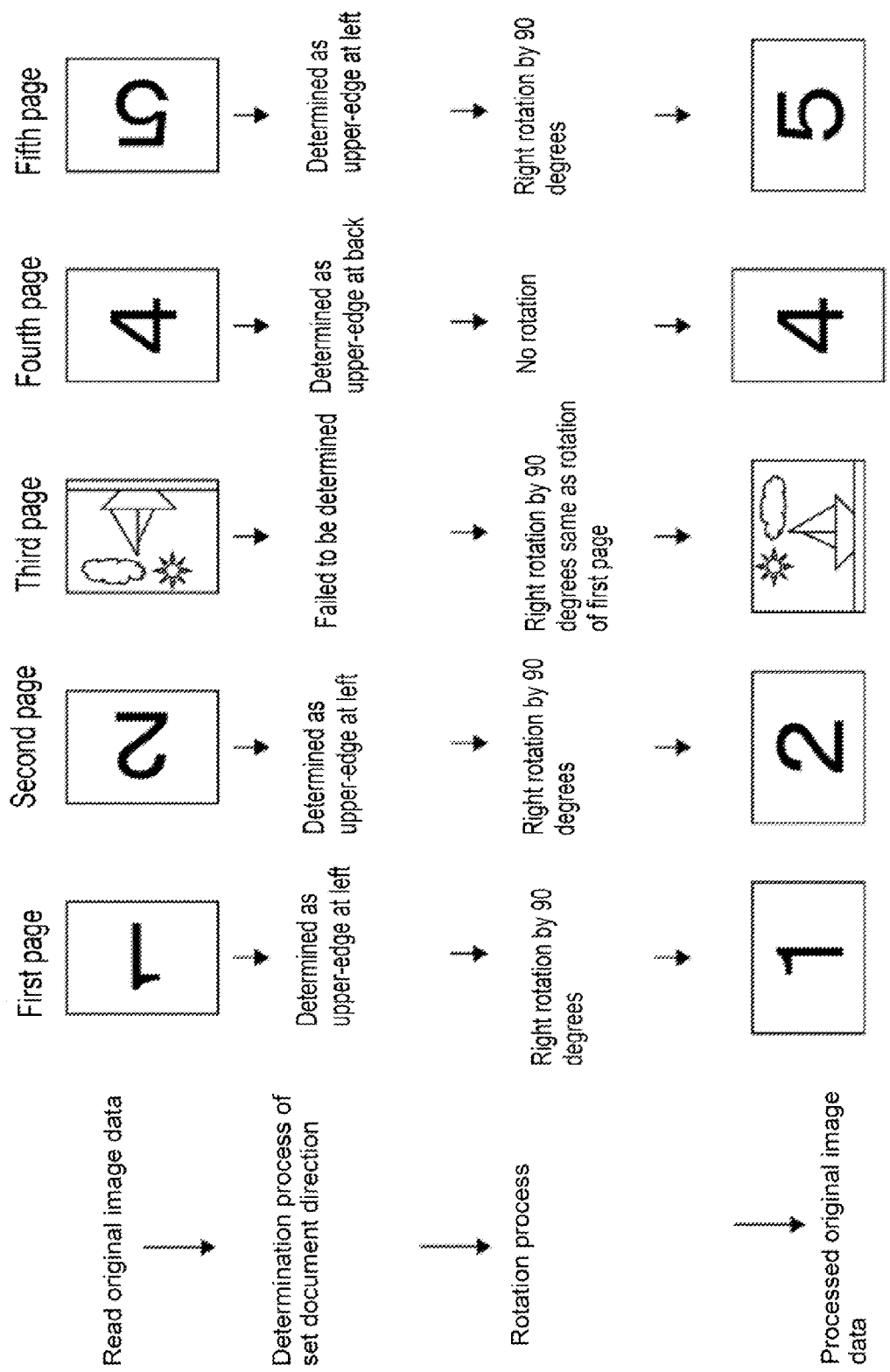
FIG. 8 illustrates the set document direction correction operation according to the second embodiment in the image forming apparatus.

Next, the following describes processes by the image forming apparatus 1 according to a second embodiment with reference to FIG. 7 and FIG. 8.

A process on the first document is the same as the process of the first embodiment. However, a rotation direction of the rotation process performed on the document on the first page is held (Step 201).

First, if the determination result by the set document direction determination process is determined as upper-edge at back, since the direction matches the read set document direction, the rotation process is not performed at Step 108. Then, the rotation process performed at Step 102 is held as the rotation process on the first page (Step 201). Then, the storage unit 9 saves the rotation-processed original image data (Step 109).

On the other hand, if the set document direction is failed to be determined at Step 108, the set document direction determining unit 73 instructs the rotation process based on the setting of the set document direction accepted at Step 101 to the image processor 8. Then, the image processor 8 performs the rotation process based on the set document direction accepted at Step 101 (Step 110). Then, the image processor 8 holds the rotation process performed at Step 110 as the rotation process on the first page (Step 201). Then, the storage unit 9 saves the processed original image data (Step 109).

For example, when the left direction setting of the upper edge is accepted at Step 101, the rotation process at Step 110 rotates the original image data by 90 degree right. At this time, at Step 201, the right rotation by 90 degree is held as the rotation process for the first page. When the back direction setting of the upper edge is accepted at Step 101, since the direction matches the read set document direction, the rotation process is not performed at Step 110. At this time, at Step 201, "no rotation" is held as the rotation process on the first page.

Next, the control unit 7 determines whether the subsequent document MS is present or not (Step 111). When the subsequent document MS is present, the process proceeds to Step 204.

Step 204 to Step 209 are the same as Step 104 to Step 109. Otherwise, the same processes as the processes of the first embodiment are performed.

On the other hand, if the set document direction is not successfully determined at Step 207, the set document direction determining unit 73 instructs the image processor 8 to perform the rotation process same as the rotation process on the first page held at Step 201. Then, the image processor 8 performs the rotation process same as the rotation process for the first page held at Step 201 (Step 210), then the storage unit 9 saves the processed original image data (Step 209).

For example, like the third page illustrated in FIG. 6, if the determination result of the set document direction determination process is failed to be determined, the original image data is rotated by 90 degree right as the rotation process same as the rotation process on the first page held at Step 201.

Next, the control unit 7 determines whether the subsequent document MS is present or not, that is, whether the document MS is placed at the document placing portion 31 of the document feeding unit 3 or not (Step 111). When the subsequent document MS is present, the process returns to Step 204.

If the subsequent document MS is absent at Step 111, the processes proceed to Step 112 and Step 113, and then the process is completed.

Otherwise, the same processes as the processes of the first embodiment are performed.

As described above, in the second embodiment, the image forming apparatus 1 includes the document feeding unit 3, the document reading unit 2, the set document direction accepting unit 71, the set document direction determining unit 73, and the image processor 8. The document feeding unit 3 is configured to sequentially convey the set documents MS. The document reading unit 2 is configured to read a document image of the document MS conveyed by the document feeding unit 3. The set document direction accepting unit 71 is configured to accept setting of a set document direction of the documents MS set at the document feeding unit 3. The set document direction determining unit 73 is configured to determine a set document direction of the documents MS set to the document feeding unit 3 based on original image data read by the document reading unit 2. The image processor 8 is configured to perform a rotation process on original image data read by the document reading unit 2. The image processor 8 is configured to perform a rotation process on original image data based on a determination result by the set document direction determining unit 73. When determination by the set document direction determining unit 73 fails, the image processor 8 is configured to perform a rotation process on the original image data on the first page based on the set document direction accepted by the set document direction accepting unit 71, and perform a rotation process same as the rotation process on the original image data on the first page on the original image data on second and subsequent pages.

This configuration ensures determining the set document direction while preliminary setting the set document direction due to a photograph, a blank sheet, or a similar document. Thus, even documents to which the set document direction is failed to be determined, the upper edges of the documents can be correctly aligned. That is, considering a general bundle of documents with a plurality of pages, the upper edges of most pages (photograph pages) have the same direction. The upper edges of some pages often have different directions from other pages. Originally, it rarely happens that the upper edges of the bundle of documents are in four different directions or a similar case. Additionally, in most cases, the first page of the bundle of documents has the same direction as the direction of the upper edges of most other pages (including photographs). Therefore, the disclosure ensures creating the image files with the upper edges of images read from the bundle of documents aligned. In particular, the disclosure is suitable for the bundle of documents that includes some pages of character documents with different image direction while including a photograph image with the same direction as the direction of most pages.

Furthermore, in the second embodiment, the set document direction accepting unit 71 is configured to accept setting of any one of set document directions of two directions (upper-edge at back, upper-edge at left) perpendicular to one another. The set document direction determining unit 73 is configured to determine a set document direction (upper-edge at back, upper-edge at left) whose setting is accepted by the set document direction accepting unit 71. This configuration ensures reducing the work load taken for the set document direction determination process.

Third Embodiment

Next, the following describes processes by the image forming apparatus 1 according to a third embodiment with reference to FIGS. 9A to 9E and FIG. 11.

Figure 9A:
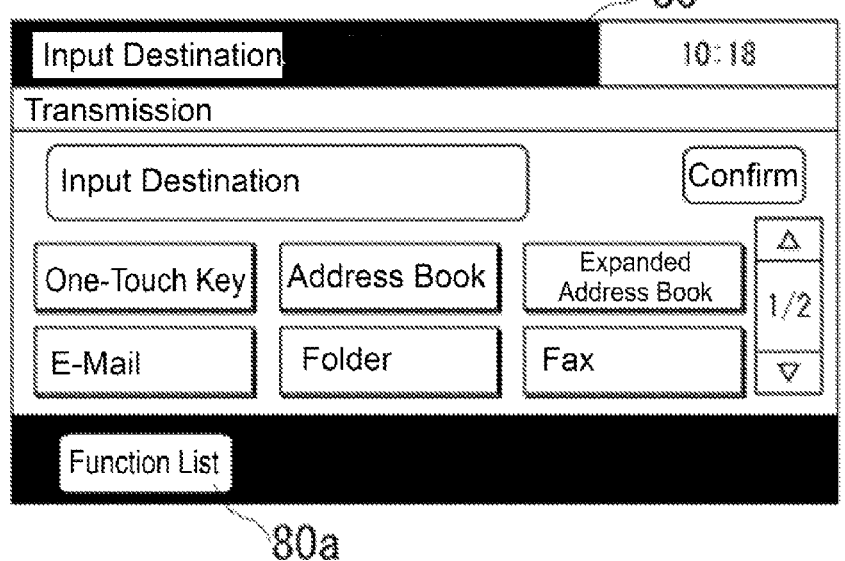
FIGS. 9A to 9E illustrate setting screen examples displayed on the liquid crystal display unit of the operation unit according to a third embodiment.
Figure 9B:
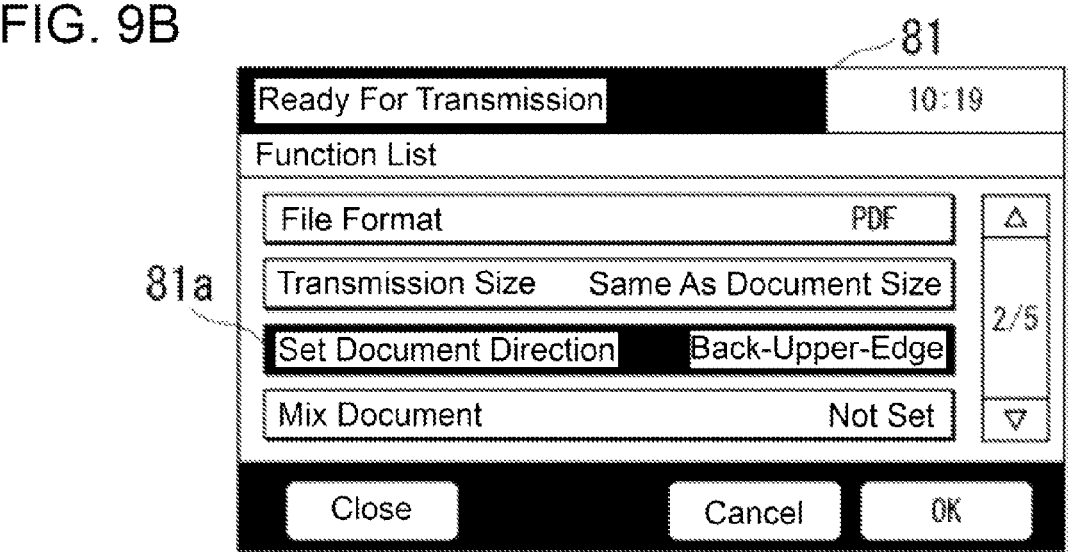

When a user sets the documents MS at the document placing portion 31 of the document feeding unit 3 and instructs reading document images with the operation unit 5, the control unit 7 causes the liquid crystal display unit 51 to display a transmission destination setting screen 80, which is illustrated in FIG. 9A, and accepts a transmission destination setting. The transmission destination setting screen 80 includes the function list key 80a. By operation of the function list key 80a, the control unit 7 causes the liquid crystal display unit 51 to display the function list screen 81, which is illustrated in FIG. 9B. The function list screen 81 is a screen for accepting selection of set function. The function list screen 81 includes the set document direction key 81a.

Figure 9C:
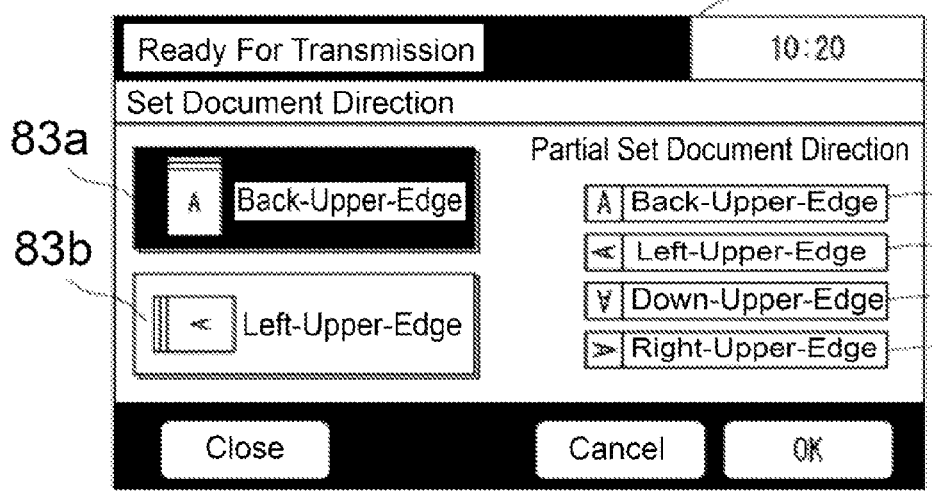
Figure 9D:
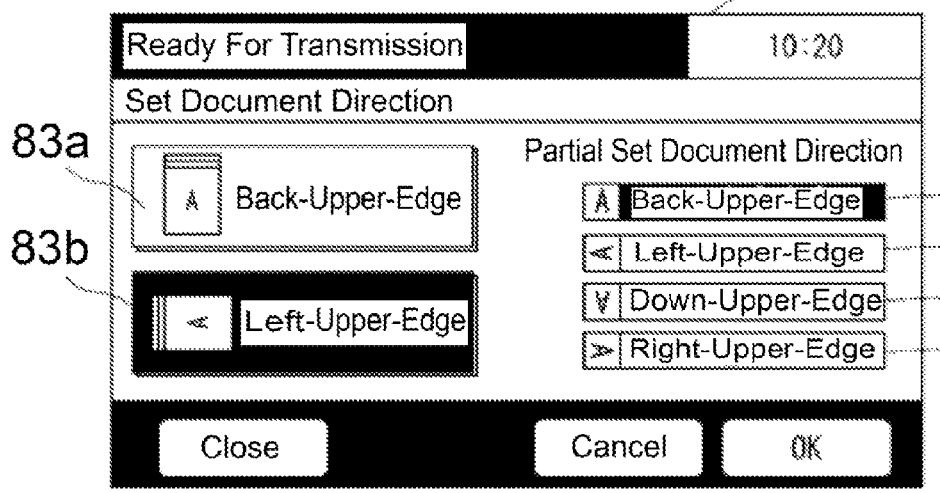

By operation of the set document direction key 81a, the control unit 7 causes the liquid crystal display unit 51 to display a set document direction setting screen 83, which is illustrated in FIGS. 9C and 9D. The set document direction setting screen 83 includes a back direction setting key 83a and a left direction setting key 83b for setting any one of the set document directions of two directions perpendicular to one another as a first set document direction, which is the set document direction of most pages. The back direction setting key 83a sets the upper edges to the back direction. The left direction setting key 83b sets the upper edges to the left direction. The control unit 7 functions as the set document direction accepting unit 71 and accepts the setting of the first set document direction (Step 301).

The set document direction setting screen 83 includes a partial back direction setting key 83c, a partial left direction setting key 83d, a partial down direction setting key 83e, and a partial right direction setting key 83f as a second set document direction, which is the set document direction of some pages. The partial back direction setting key 83c sets the upper edges to the back direction, the partial left direction setting key 83d sets the upper edges to the left direction, the partial down direction setting key 83e sets the upper edges to the down direction, and the partial right direction setting key 83f sets the upper edges to the right direction.

With the partial back direction setting key 83c, the partial left direction setting key 83d, the partial down direction setting key 83e, and the partial right direction setting key 83f, any one of three directions other than the first set document direction is selectable. The control unit 7 functions as the set document direction accepting unit 71 and accepts the setting of the second set document direction (Step 302). FIG. 9C illustrates a state where the first set document direction is selected so that the upper edge is in the back direction using the back direction setting key 83a.

Figure 9E:
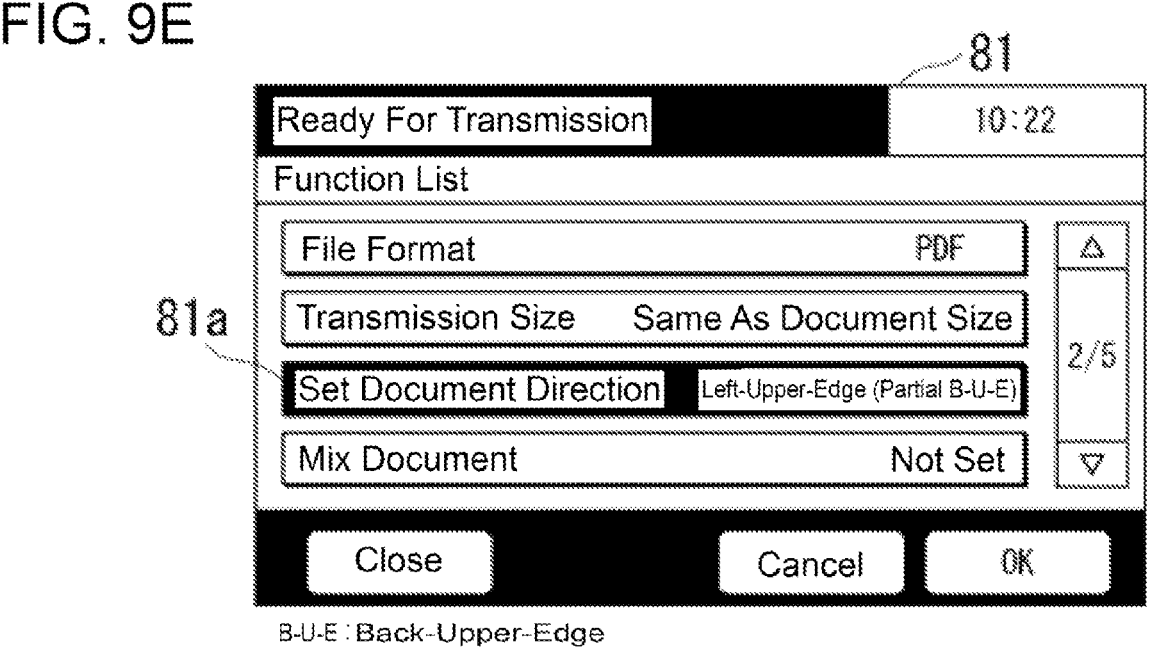
Figure 10:
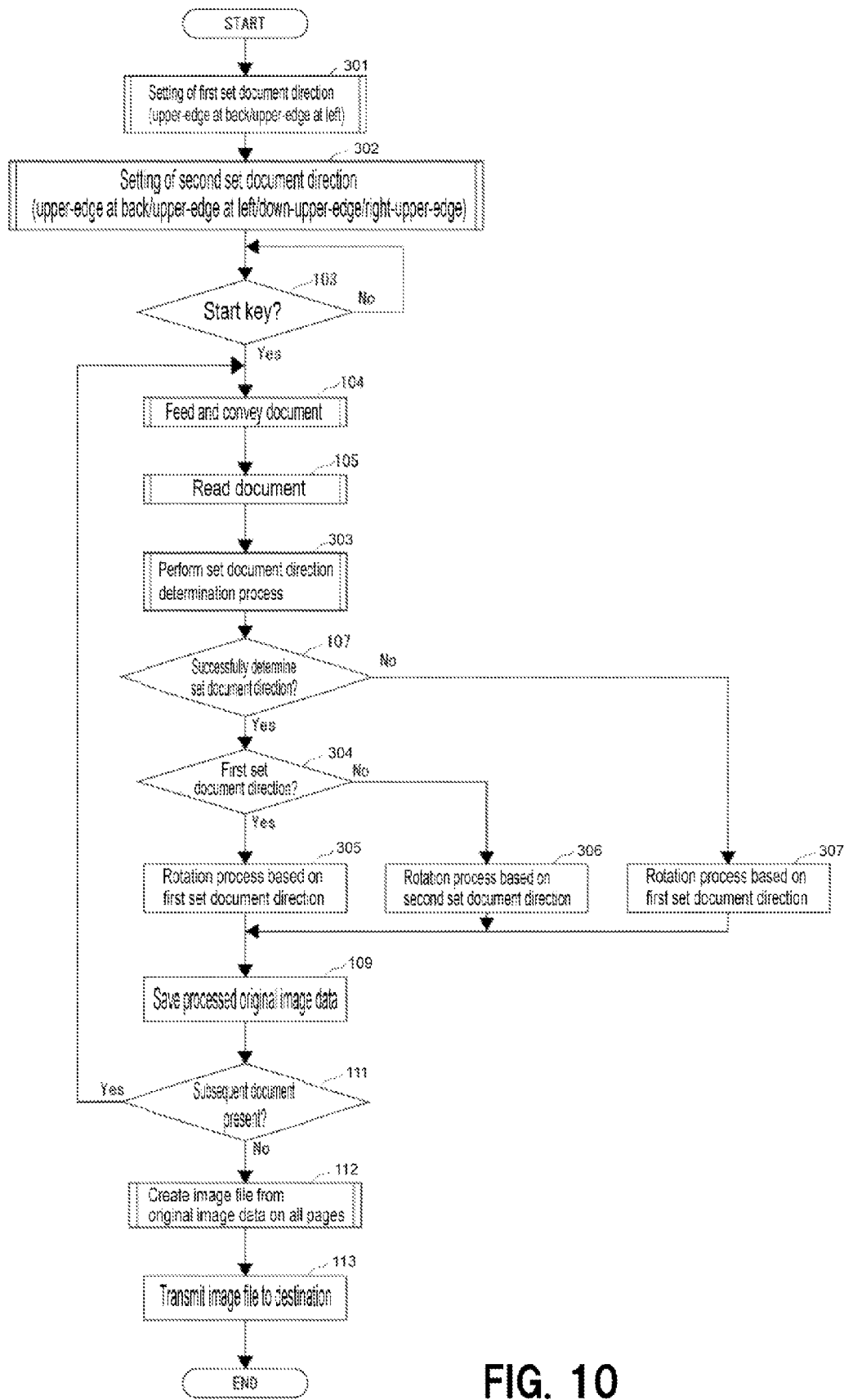
FIG. 10 illustrates the set document direction correction operation in the image forming apparatus according to the third embodiment of the disclosure.

FIG. 9D illustrates a state where the first set document direction is selected so that the upper edge is in the left direction using the left direction setting key 83b while the second set document direction is selected so that the upper edge is in the back direction using the partial back direction setting key 83c. Further, FIG. 9E illustrates a state where the OK key is operated at the set document direction setting screen 83, the first set document direction is set so that the upper edge is in the left direction, and the second set document direction is set so that the upper edge is in the back direction.

The processes of Step 103 to Step 105 are the same as the processes of Step 103 to Step 105 of the first embodiment.

Next, the control unit 7 functions as a set document direction determining unit 73. The control unit 7 performs a set document direction determination process based on the original image data stored in the image memory 72 (Step 303).

The determination process by the set document direction determining unit 73 at Step 303 is performed only on the first set document direction whose setting is accepted at Step 301 and the second set document direction whose setting is accepted at Step 302. The set document direction determining unit 73 performs OCR processes on the original image data rotated in the respective first set document direction and second set document direction. Then, the set document direction determining unit 73 calculates recognition ratios in the respective directions.

If the recognition ratios are less than predetermined values in all directions, the set document direction determining unit 73 determines that the determination is failed. If the recognition ratio is equal to or more than the predetermined value in any of equal to or more than one direction, the direction with the highest recognition ratio is determined as the set document direction. Accordingly, the OCR processes are performed only on the two directions of the first set document direction and the second set document direction, and then the set document direction is determined. This reduces a work load taken for the determination process; and therefore is preferable.

Next, the set document direction determining unit 73 determines whether the set document direction is successfully determined or not (Step 107). When the set document direction is successfully determined at Step 107, the set document direction determining unit 73 further determines whether the determination result is the first set document direction or not (Step 304). When the determination result at Step 304 is the first set document direction, the set document direction determining unit 73 instructs the image processor 8 to perform the rotation process based on the first set document direction. Then, the image processor 8 performs the rotation process based on the first set document direction (Step 305).

Figure 16:
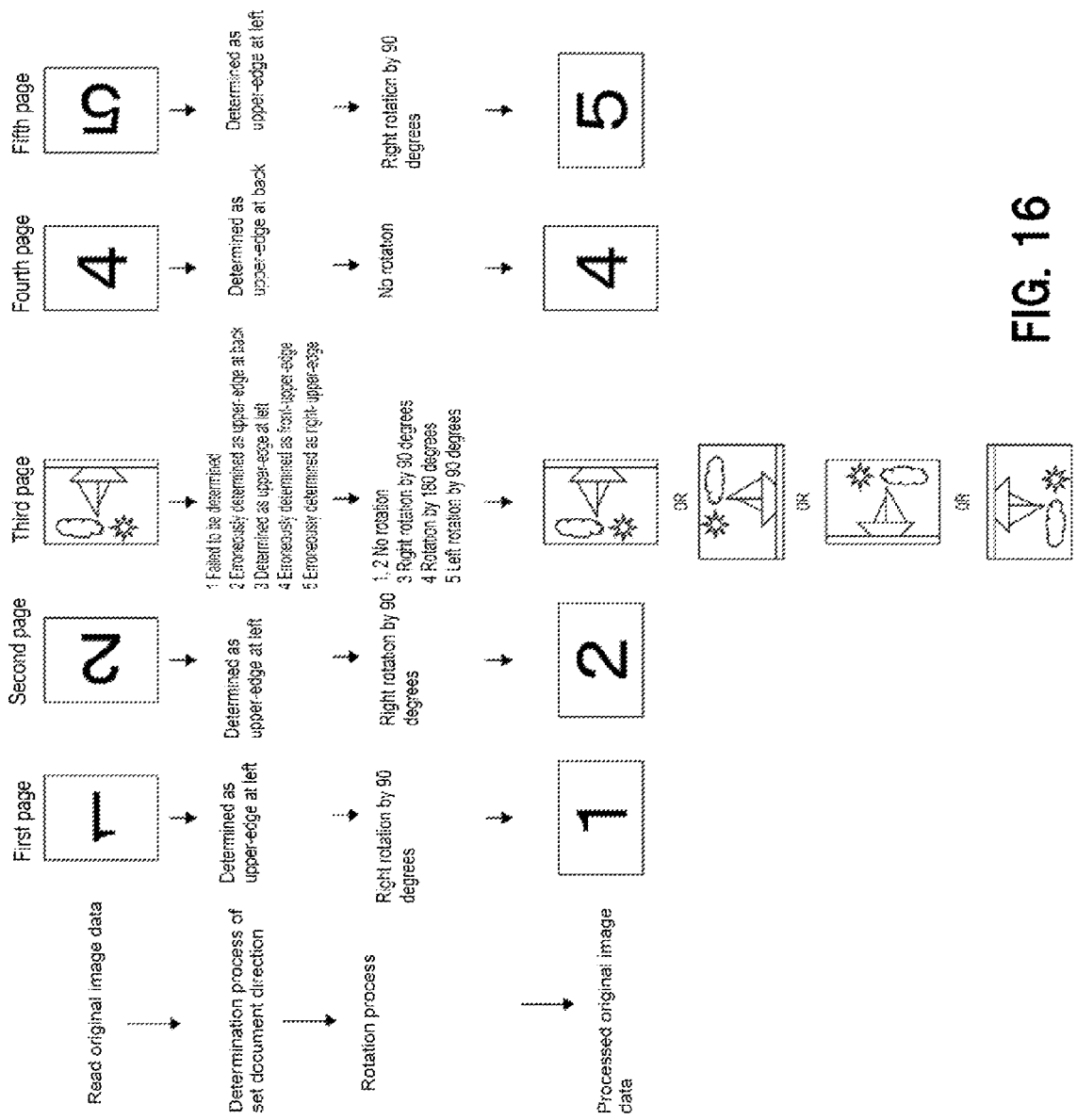
FIG. 16 illustrates one exemplary set document direction correction operation.
Figure 17:
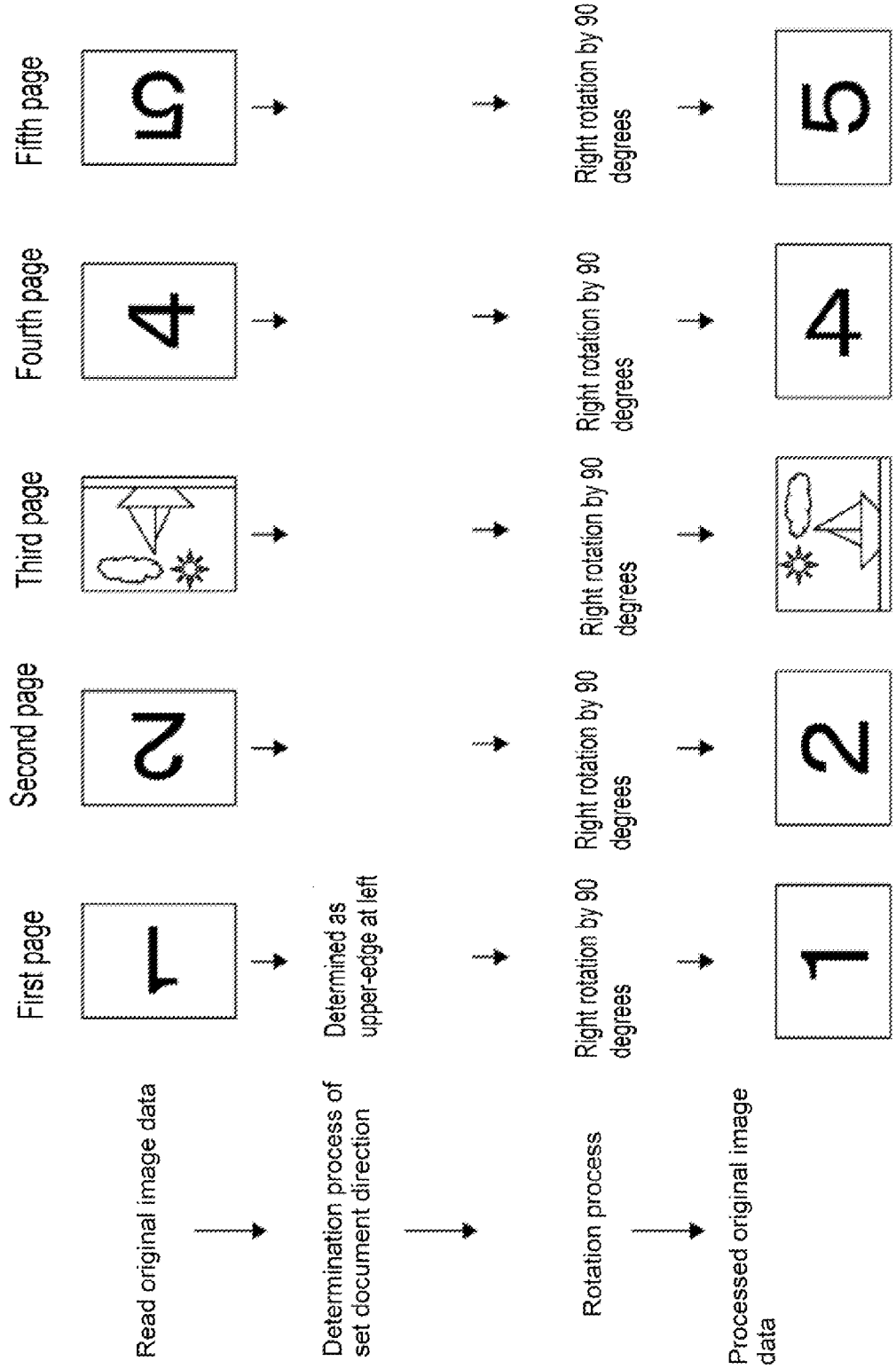
FIG. 17 illustrates another exemplary set document direction correction operation.

For example, like the first page, the second, and the fifth pages illustrated in FIG. 16, when the determination result of the set document direction determination process is determined as upper-edge at left, which is the first set document direction, the original image data is rotated by 90 degree right by the rotation process at Step 305.

At Step 304, if the determination result is not the first set document direction, the determination result is the second set document direction. Accordingly, the set document direction determining unit 73 instructs the image processor 8 to perform the rotation process based on the second set document direction. Then, the image processor 8 performs the rotation process based on the second set document direction (Step 306).

Figure 11:
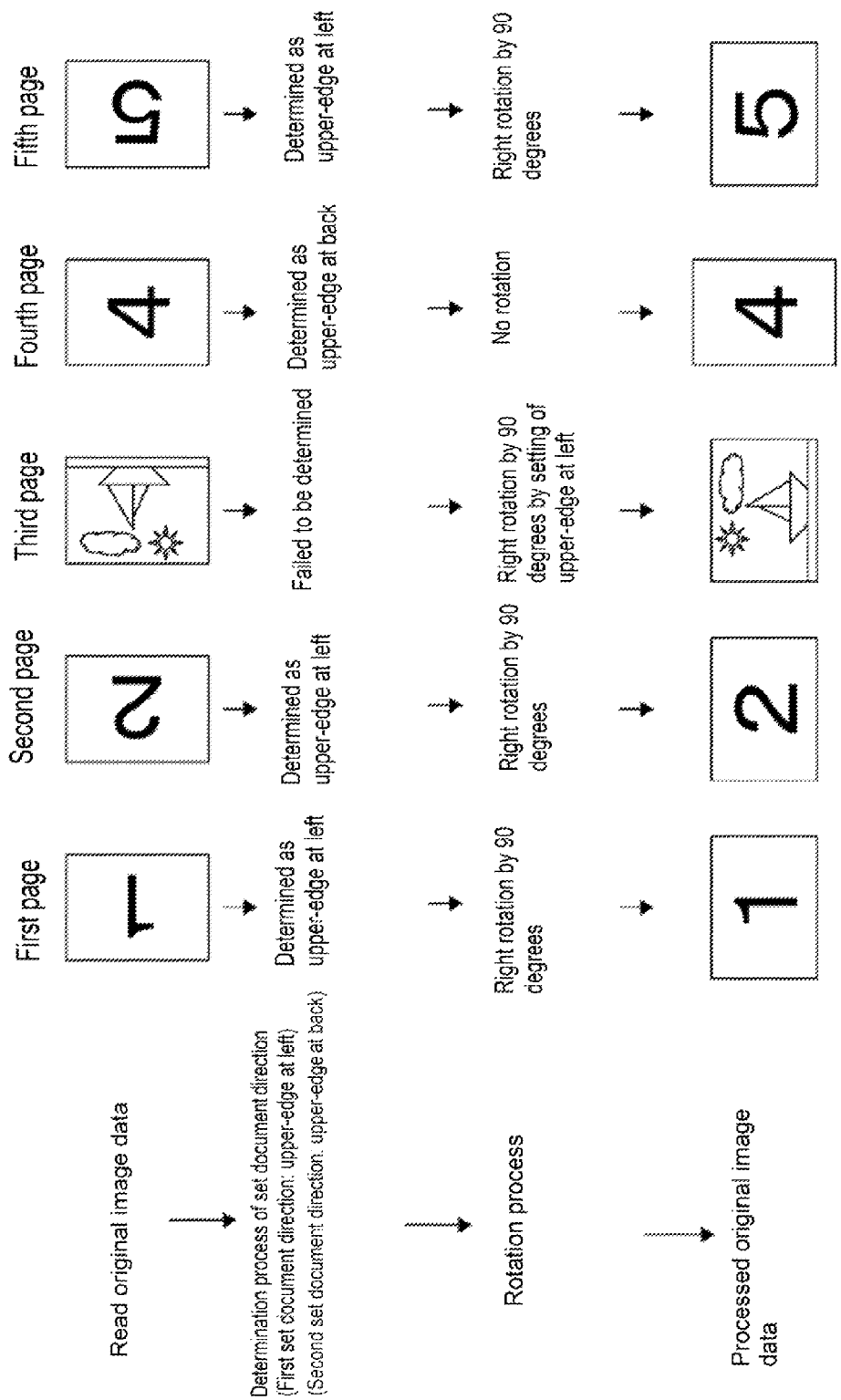
FIG. 11 is for explanation of the set document direction correction operation in the image forming apparatus according to the third embodiment of the disclosure.

Like the fourth page illustrated in FIG. 11, if the determination result by the set document direction determination process is determined as upper-edge at back, which is the second set document direction, since the direction matches the read set document direction, the rotation process is not performed at Step 306.

On the other hand, if the set document direction is failed to be determined at Step 107, the set document direction determining unit 73 instructs the rotation process based on the first set document direction to the image processor 8. Then, the image processor 8 performs the rotation process based on the first set document direction (Step 307).

Like the third page illustrated in FIG. 11, if the set document direction is failed to be determined, similarly to the case of being determined as the upper-edge at left, which is the first set document direction, the rotation process at Step 305 rotates the original image data by 90 degree right. Otherwise, the same processes as the processes of the first embodiment are performed.

As described above, with this embodiment, the image forming apparatus 1 includes the document feeding unit 3, the document reading unit 2, the set document direction accepting unit 71, the set document direction determining unit 73, and the image processor 8. The document feeding unit 3 is configured to sequentially convey the set documents MS. The document reading unit 2 is configured to read a document image of the document MS conveyed by the document feeding unit 3. The set document direction accepting unit 71 is configured to accept respective settings of a first set document direction and a second set document direction of the documents MS set at the document feeding unit 3. The set document direction determining unit 73 is configured to determine a set document direction of the documents MS set to the document feeding unit 3 only on two directions of the first set document direction and the second set document direction accepted by the set document direction accepting unit 71 based on original image data read by the document reading unit 2. The image processor 8 is configured to perform a rotation process on original image data read by the document reading unit 2. The image processor 8 is configured to perform a rotation process on original image data based on a determination result by the set document direction determining unit 73. When determination by the set document direction determining unit 73 fails, the image processor 8 is configured to perform a rotation process based on the first set document direction accepted by the set document direction accepting unit 71.

This configuration determines the set document direction preliminary limiting to two directions. This ensures reducing the work load taken for the determination process of document direction for each page. Additionally, the upper edges of the documents whose set document directions are failed to be determined can also be correctly aligned by matching the directions to the set document direction of most pages. That is, considering a general bundle of documents with a plurality of pages, the upper edges of most pages (photograph pages) have the same direction. The upper edges of some pages often have a different direction from other pages. Therefore, the user can preliminarily confirm assumed two directions, ensuring limiting the determination on the document direction to two directions.

Furthermore, in this embodiment, the set document direction accepting unit 71 is configured to accept setting of any one of set document directions of two directions (upper-edge at back, upper-edge at left) perpendicular to one another as setting of a first set document direction. The set document direction accepting unit 71 is configured to accept setting of any one of set document directions of three directions (three directions among the upper-edge at back, the upper-edge at left, the down-upper-edge, and the right-upper-edge) other than the first set document direction as setting of a second set document direction. This configuration ensures setting the first set document direction and the second set document direction without confusing the user.

Fourth Embodiment

Figure 12:
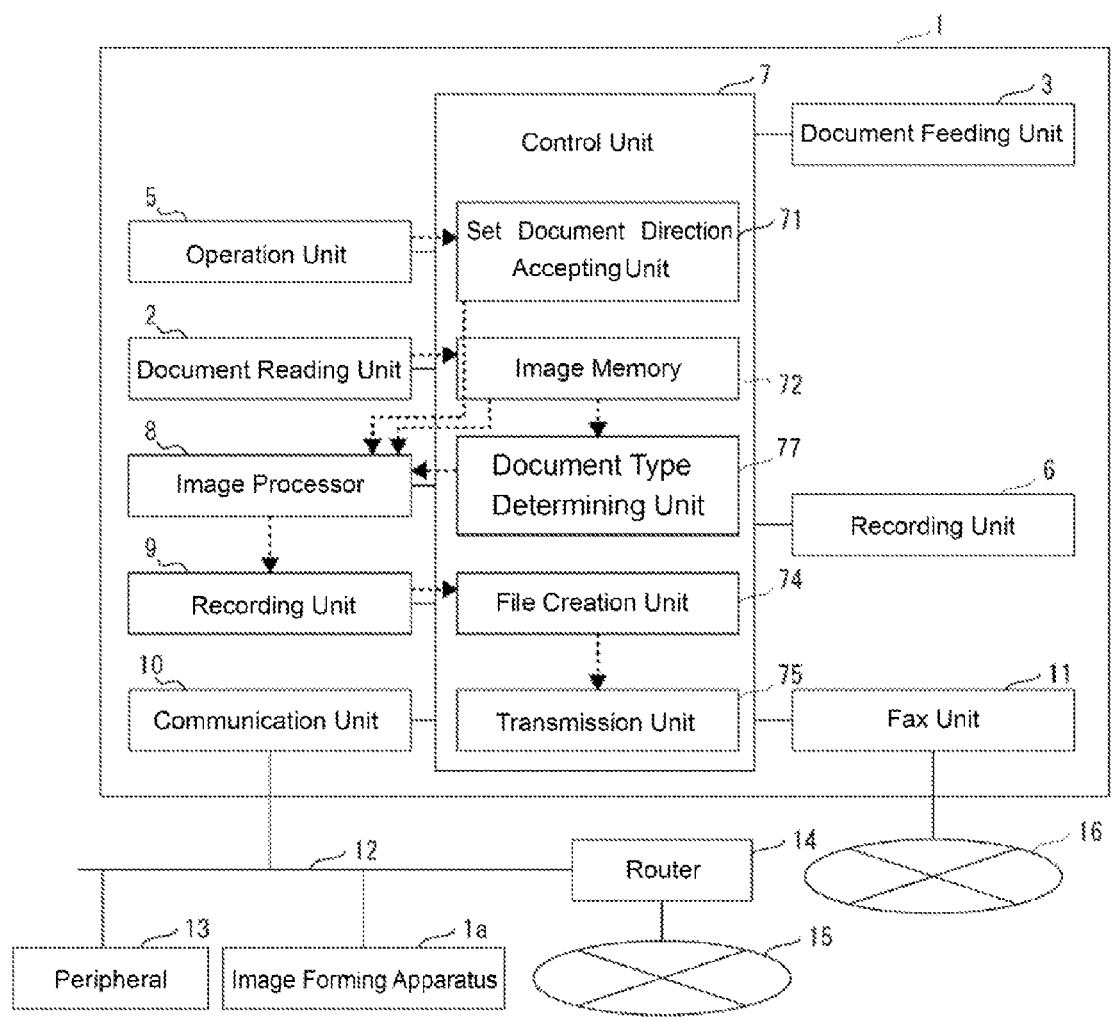
FIG. 12 illustrates a schematic configuration of the image forming apparatus according to a fourth embodiment.

FIG. 12 illustrates a schematic configuration of a fourth embodiment.

Next, the following describes processes by the image forming apparatus 1 according to the fourth embodiment with reference to FIG. 12 to FIG. 15.

Figure 13A:
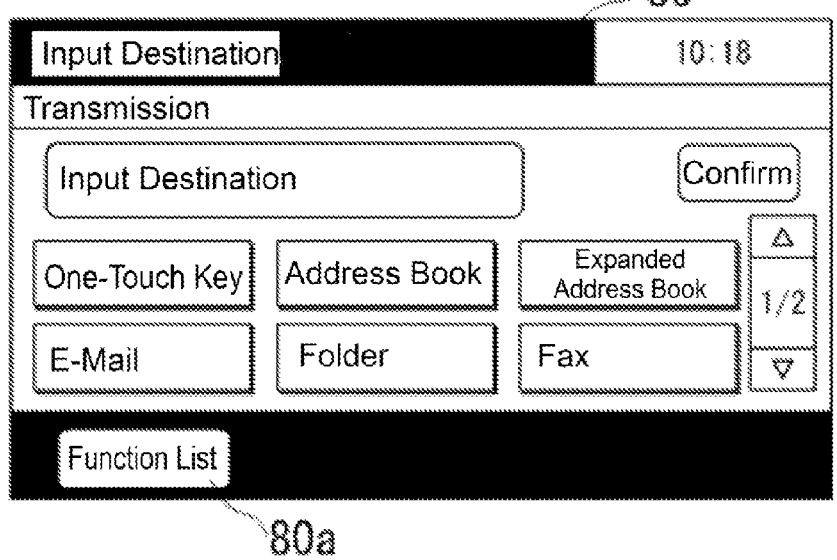
FIGS. 13A to 13E illustrate setting screen examples displayed on the liquid crystal display unit of the operation unit according to the fourth embodiment.
Figure 13B:
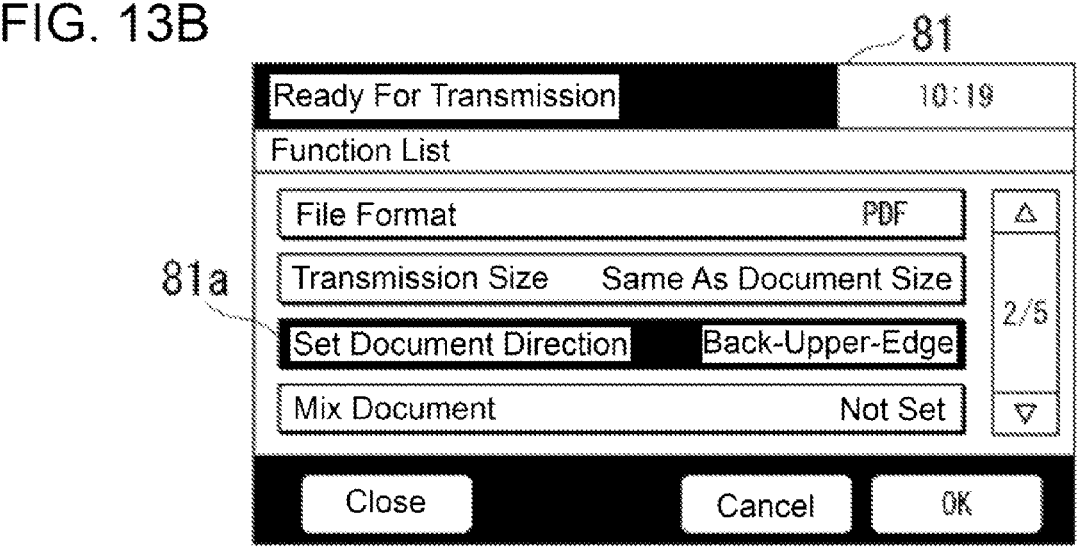

When the user sets the documents MS at the document placing portion 31 of the document feeding unit 3 and instructs reading document images with the operation unit 5, the control unit 7 causes the liquid crystal display unit 51 to display a transmission destination setting screen 80, which is illustrated in FIG. 13A, and accepts a transmission destination setting. The transmission destination setting screen 80 includes the function list key 80a. By operation of the function list key 80a, the control unit 7 causes the liquid crystal display unit 51 to display the function list screen 81, which is illustrated in FIG. 13B. The function list screen 81 is a screen for accepting selection of set function. The function list screen 81 includes the set document direction key 81a.

Figure 13C:
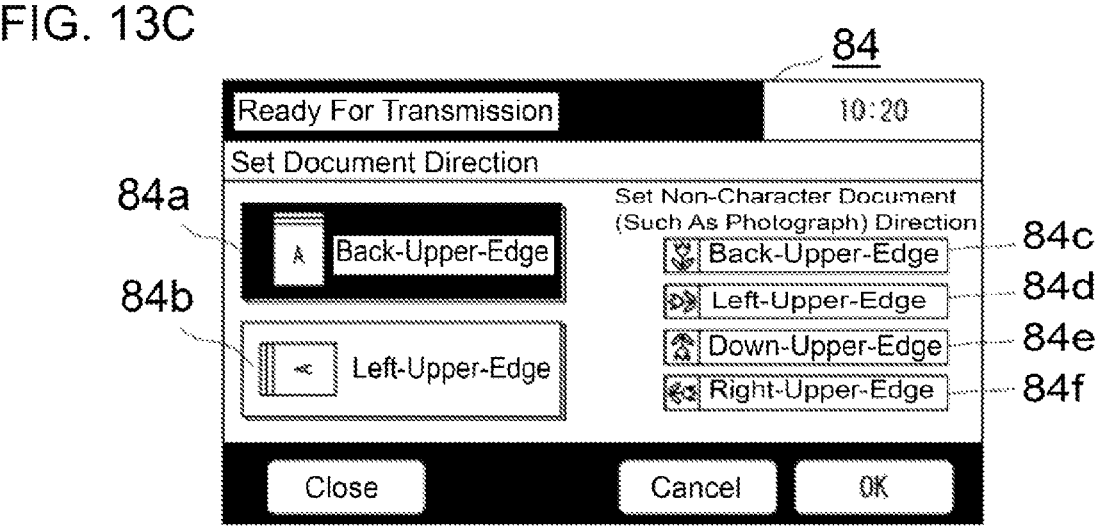
Figure 13D:
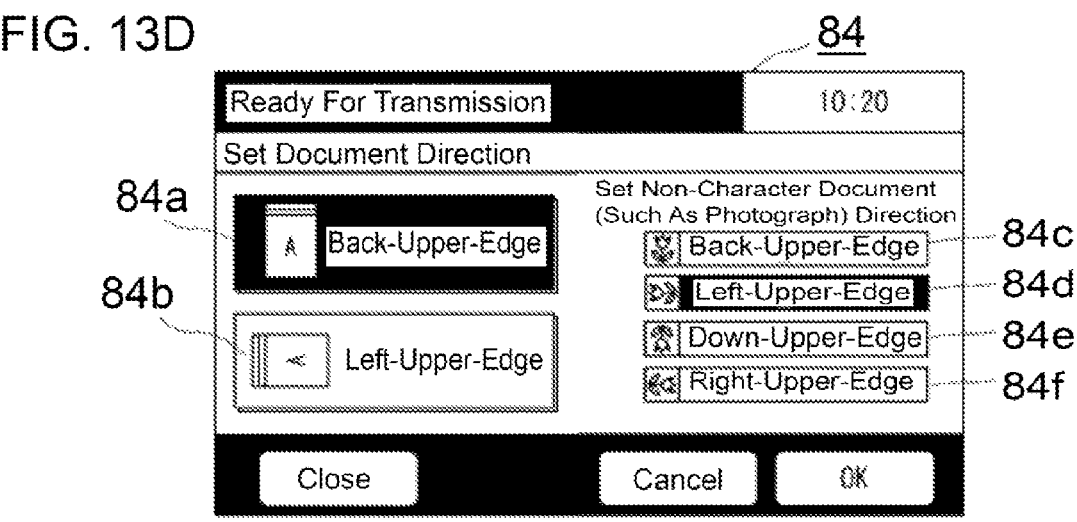

By operation of the set document direction key 81a, the control unit 7 causes the liquid crystal display unit 51 to display a set document direction setting screen 84, which is illustrated in FIGS. 13C and 13D. The set document direction setting screen 84 includes a character document back direction setting key 84a and a character document left direction setting key 84b. The document back direction setting key 84a and the character document left direction setting key 84b are for setting any one of the set document directions of two directions perpendicular to one another as the set character document direction, which is the set document direction of the documents MS on which characters are displayed. The character document back direction setting key 84a sets the upper edges to the back direction, while the character document left direction setting key 84b sets the upper edges to the left direction. The control unit 7 functions as the set document direction accepting unit 71 and accepts the setting of the set character document direction (Step 401).

The set document direction setting screen 84 includes a non-character document back direction setting key 84c, a non-character document left direction setting key 84d, a non-character document down direction setting key 84e, and a non-character document right direction setting key 84f. The non-character document back direction setting key 84c sets the upper edges to the back direction, the non-character document left direction setting key 84d sets the upper edges to the left direction, the non-character document down direction setting key 84e sets the upper edges to the down direction, and the non-character document right direction setting key 84f sets the upper edges to the right direction as the set non-character document direction, which is the set document direction of the documents MS on which characters are not displayed, such as photographs and illustrations.

With the non-character document back direction setting key 84c, the non-character document left direction setting key 84d, the non-character document down direction setting key 84e, and the non-character document right direction setting key 84f, any one of three directions other than the set character document direction is selectable. The control unit 7 functions as the set document direction accepting unit 71 and accepts the setting of the set non-character document direction (Step 402).

FIG. 13C illustrates a state where the set character document direction is selected so that the upper edges are in the back direction using the character document back direction setting key 84a. FIG. 13D illustrates a state where the set character document direction is selected so that the upper edges are in the back direction using the character document back direction setting key 84a and the set non-character document direction is selected so that the upper edges are in the left direction using the non-character document left direction setting key 84d.

Figure 13E:
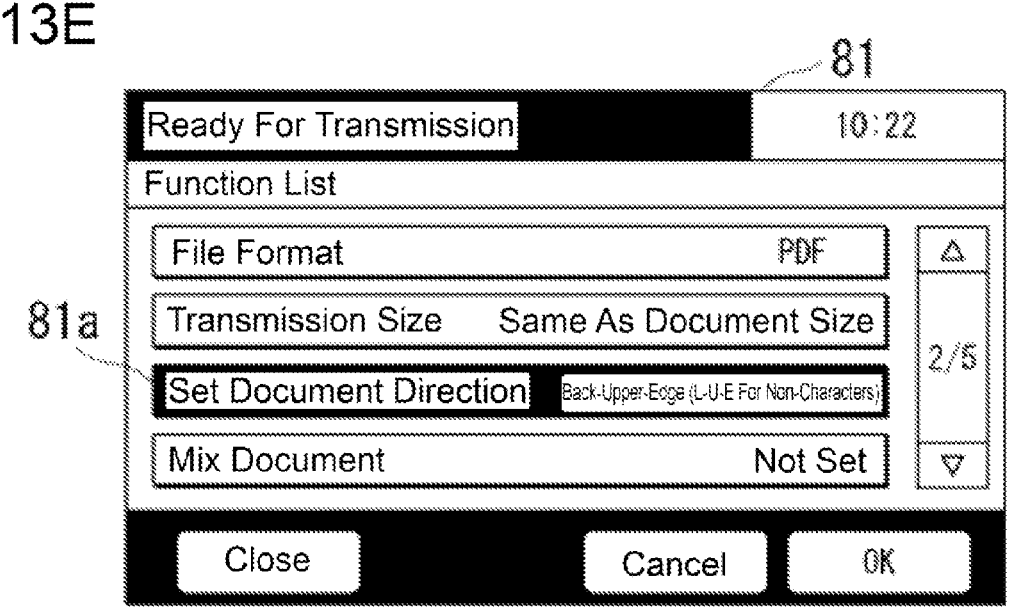
Figure 14:
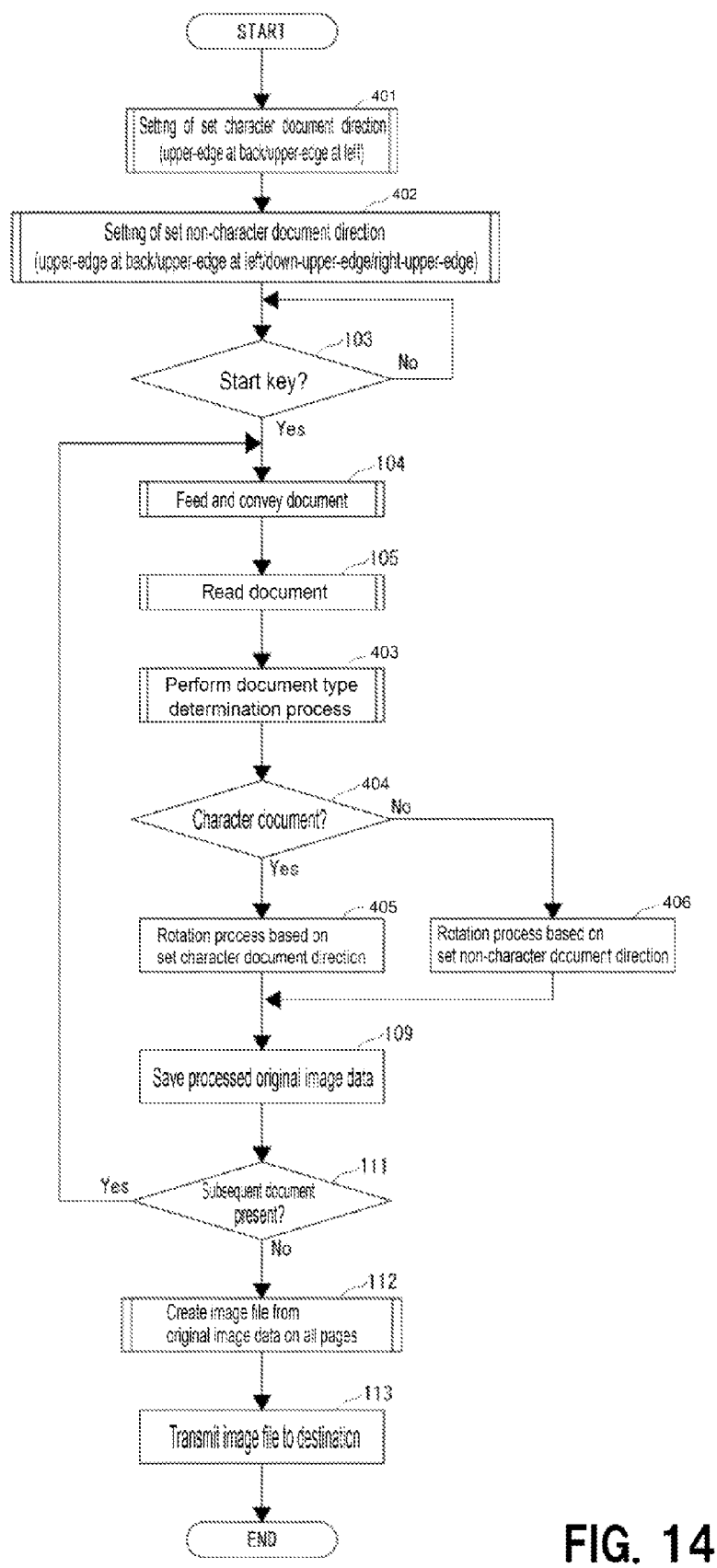
FIG. 14 illustrates the set document direction correction operation according to the fourth embodiment in the image forming apparatus.

Further, FIG. 13E illustrates a state where the OK key is operated at the set document direction setting screen 84, the set character document direction is set so that the upper edges are in the back direction, and the set non-character document direction is set so that the upper edges are in the left direction.

The processes of Step 103 to Step 105 are the same as the processes of Step 103 to Step 105 of the first embodiment.

Next, the control unit 7 functions as the document type determining unit 77. The control unit 7 performs a document type determination process (Step 403). The document type determination process determines whether the document is a character document or not based on the original image data stored in the image memory 72.

The determination process by the document type determining unit 77 at Step 404 performs OCR processes on the original image data rotated in the set character document direction whose setting is accepted at Step 401. Then, the document type determining unit 77 calculates a recognition ratio. If the recognition ratio is less than a predetermined value, the document type determining unit 77 determines that the determination is failed. If the recognition ratio is equal to or more than the predetermined value in any of equal to or more than one direction, the direction with the highest recognition ratio is determined as the set document direction. Accordingly, the OCR process is performed only on the one direction of the set character document direction. This reduces a work load taken for the determination process of document type, and therefore is preferable.

Next, the document type determining unit 77 determines whether the document is a character document or not (Step 407). If the document is found to be a character document at Step 107, the document type determining unit 77 instructs the rotation process based on the set character document direction to the image processor 8. Then, the image processor 8 performs the rotation process based on the set character document direction (Step 405).

Figure 15:
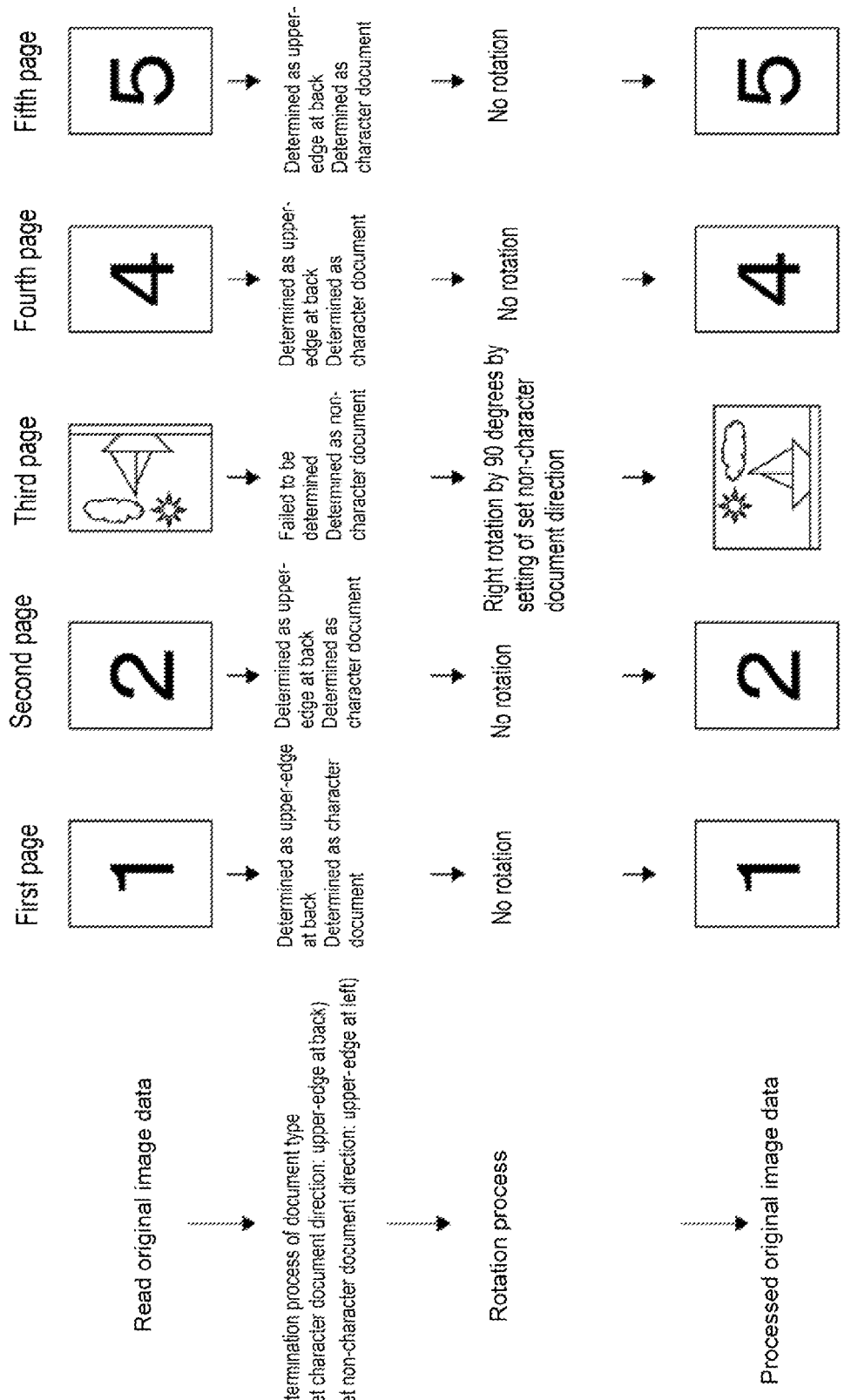
FIG. 15 illustrates the set document direction correction operation according to the fourth embodiment in the image forming apparatus.

For example, like the first, second, fourth, and the fifth pages illustrated in FIG. 15, if the determination result by the document type determination process is a character document, the upper-edge at back, which is the set character document direction, matches the read set document direction.

At Step 404, if the determination result is not the character document, the document type determining unit 77 instructs the rotation process based on the set non-character document direction to the image processor 8. Then, the image processor 8 performs the rotation process based on the set non-character document direction (Step 406). Like the third page illustrated in FIG. 15, if the determination result by the document type determination process is a non-character document, the rotation process at Step 406 rotates the original image data by 90 degree right based on the upper-edge at left, which is the set non-character document direction. Otherwise, the same processes as the processes of the first embodiment are performed.

As described above, in this embodiment, the image forming apparatus 1 includes the document feeding unit 3, the document reading unit 2, the set document direction accepting unit 71, the document type determining unit 77, and the image processor 8. The document feeding unit 3 is configured to sequentially convey the set documents MS. The document reading unit 2 is configured to read a document image of the document MS conveyed by the document feeding unit 3. The set document direction accepting unit 71 is configured to accept respective settings of a set character document direction of a character document set at the document feeding unit 3 and a set non-character document direction of a non-character document. The document type determining unit 77 is configured to determine whether a document is a character document or not based on original image data read by the document reading unit 2. The image processor 8 is configured to perform a rotation process on original image data read by the document reading unit 2. When the document type determining unit 77 determines that the document is a character document, the image processor 8 is configured to perform a rotation process based on a set character document direction accepted by the set document direction accepting unit 71. When the document type determining unit 77 determines that the document is not a character document, the image processor 8 is configured to perform a rotation process based on a set non-character document direction accepted by the set document direction accepting unit 71. This configuration ensures correctly aligns the upper edges of bundle of documents that includes both a character document and a non-character document such as a photograph or an illustration whose set document direction is failed to be determined, and only the non-character document differs from the set character document direction.

Furthermore, in this embodiment, the document type determining unit 77 is configured to determine whether a document is a character document or not only in a set character document direction accepted by the set document direction accepting unit 71. This configuration ensures determination on the document type limiting to one direction of the set character document direction, ensuring the reduced work load taken for the determination process.

Furthermore, with this embodiment, the set document direction accepting unit 71 is configured to accept setting of any one of set document directions of two directions (upper-edge at back, upper-edge at left) perpendicular to one another as setting of a set character document direction. The set document direction accepting unit 71 is configured to accept setting of any one of set document directions of three directions (three directions among the upper-edge at back, the upper-edge at left, the down-upper-edge, and the right-upper-edge) other than a set character document direction as setting of a set non-character document direction. This configuration ensures setting the set character document direction and the set non-character document direction without confusing the user.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image processing apparatus, comprising:
    a document feeding unit configured to sequentially convey documents set on the document feeding unit;
    a document reading unit configured to read a document image of a document conveyed by the document feeding unit;
    a first set-document direction accepting key configured to accept a first set-document direction setting for a document set on the document feeding unit;
    a set-document direction determining unit configured to automatically determine, on a per-page basis, a set-document direction of documents set on the document feeding unit, based on original image data read by the document reading unit;
    an automatic determination mode setting accepting key configured to accept a setting as to whether the set-document direction determining unit attempts automatic determination of set-document direction; and
    an image processor configured to perform a rotation process on original image data read by the document reading unit; wherein
    the accepting, by the automatic determination mode setting accepting key, of the setting for the set-document direction determining unit to attempt automatic determination of set-document direction can be simultaneous with the accepting, by the first set-document direction accepting key, of the first set-document direction setting; and
    the image processor is configured to, if the setting to attempt automatic determination of set-document direction has been accepted by the first set-document direction accepting key:
        for a page for which the set-document direction determining unit succeeds in making the automatic determination of set-document direction, perform a rotation process on the original image data read by the document reading unit, based on the determination result by the set-document direction determining unit, even with the first set-document direction setting accepted by the first set-document direction accepting key, and
        for a page for which the set-document direction determining unit is unable to make the automatic determination of set-document direction, perform the rotation process based on the first set-document direction setting accepted by the first set-document direction accepting key.

2. The image processing apparatus according to claim 1, wherein:
    the first set-document direction accepting key is configured to accept a setting for either one of a predetermined two of set-document directions that are orthogonal to each other; and
    the set-document direction determining unit is configured to determine the set-document direction in only the predetermined two set-document directions for which a setting is accepted by the first set-document direction accepting key.

3. The image processing apparatus according to claim 1, further comprising:
    a set-document direction setting screen configured to simultaneously display the first set-document direction accepting key and the automatic determination mode setting accepting key, the set document direction setting screen being configured to simultaneously accept acceptance of a first document direction and acceptance of an automatic determination mode setting.

4. The image processing apparatus according to claim 2, further comprising:
a set-document direction setting screen configured to simultaneously display the first set-document direction accepting key and the automatic determination mode setting accepting key, the set document direction setting screen being configured to simultaneously accept acceptance of a first document direction and acceptance of an automatic determination mode setting.

5. The image processing apparatus according to claim 1, further comprising:
a rotation direction storage unit configured to store a rotation process direction for a first page of documents; wherein
the image processor is configured to, if the page for which the determination fails is not a first page, perform a rotation process on the page's original image data based on a rotation direction storage unit instead of the rotation process based on the first set-document direction setting accepted by the first set-document direction accepting key.

6. The image processing apparatus according to claim 5, wherein:
the first set-document direction accepting key is configured to accept a setting for either one of a predetermined two of set-document directions that are orthogonal to each other; and
the set-document direction determining unit is configured to determine the set-document direction in only the predetermined two set-document directions for which a setting is accepted by the first set-document direction accepting key.

7. The image processing apparatus according to claim 5, further comprising:
a set-document direction setting screen configured to simultaneously display the first set-document direction accepting key and the automatic determination mode setting accepting key, the set document direction setting screen being configured to simultaneously accept acceptance of a first document direction and acceptance of an automatic determination mode setting.

8. The image processing apparatus according to claim 6, further comprising:
a set-document direction setting screen configured to simultaneously display the first set-document direction accepting key and the automatic determination mode setting accepting key, the set document direction setting screen being configured to simultaneously accept acceptance of a first document direction and acceptance of an automatic determination mode setting.

9. An image processing apparatus, comprising:
a document feeding unit configured to sequentially convey documents set on the document feeding unit;
a document reading unit configured to read a document image of a document conveyed by the document feeding unit;
a first set-document direction accepting key configured to accept a first set-document direction setting for a document set on the document feeding unit;
a second set-document direction accepting key configured to accept a second set-document direction setting;
a set-document direction determining unit configured to automatically determine, on a per-page basis, a set-document direction of documents set on the document feeding unit, with respect to only two directions in a first set-document direction and a second set-document direction accepted by the respective set-document direction accepting keys, based on original image data read by the document reading unit, and
to perform the automatic determination of a set-document direction conditional on both the first set-document direction setting and the second set-document direction setting both being accepted simultaneously; and
an image processor configured to perform a rotation process on original image data read by the document reading unit; wherein
the image processor is configured to
for a page for which the set-document direction determining unit succeeds in making the automatic determination of set-document direction, perform a rotation process on the original image data read by the document reading unit, based on the determination result by the set-document direction determining unit, and
for a page for which the set-document direction determining unit is unable to make the automatic determination of set-document direction, to perform the rotation process based on the first set-document direction setting accepted by the first set-document direction accepting key, conditional on a first set-document direction setting and a second set-document direction setting both being accepted simultaneously.

10. The image processing apparatus according to claim 9, wherein:
the first set-document direction accepting key is configured to accept a setting for either one of a predetermined two of set-document directions that are orthogonal to each other, as a setting for the first set-document direction;
the second set-document direction accepting key is configured to accept a setting for any one of set-document directions in three directions other than the first set-document direction, as a setting for a second set-document direction; and
the set-document direction determining unit determines the set-document direction only in the one direction of the setting that the first set-document direction accepting key accepts and the one direction of the setting that the second set-document direction accepting key accepts.

11. An image processing apparatus, comprising:
a document feeding unit configured to sequentially convey documents set on the document feeding unit;
a document reading unit configured to read a document image of a document conveyed by the document feeding unit;
a third set-document direction accepting key configured to accept respective settings for a set text-document direction for text documents, and for a set non-text document direction for non-text documents set on the document feeding unit;
an image processor configured to perform a rotation process on original image data read by the document reading unit; and
a document type determining unit configured to determine whether a given document is a text document, based on original image data read by the document reading unit, and, conditional on the given document being determined to be a text document, to instruct the image processor to perform the rotation process based on the settings accepted by the third set-document direction accepting key;

wherein the image processor is configured to perform the rotation process instructed by the document type determining unit, conditional on the third set-document direction accepting key accepting a setting for a set text-document direction simultaneously with a setting for a set non-text document direction, and to perform a rotation process based on the set non-text document direction accepted by the set-document direction accepting unit if the document is determined not to be a text document by the document type determining unit.

12. The image processing apparatus according to claim 11, wherein the document type determining unit is configured to determine whether a document is a text document by only the set text-document direction accepted by the third set-document direction accepting key, and the document type determining unit determine whether a document is a text document only in the accepted set text-document direction.

13. The image processing apparatus according to claim 11, wherein the third set-document direction accepting key is configured to accept a setting for either one of a predetermined two of set-document directions that are orthogonal to each other, as a setting for the set text-document direction, the third set document direction accepting key being configured to accept a setting for any one of set-document directions in three directions other than the set text-document direction, as a setting for the set non-text document direction.

14. The image processing apparatus according to claim 12, wherein the third set document direction accepting key is configured to accept a setting for either one of a predetermined two of set-document directions that are orthogonal to each other, as a setting for the set text-document direction, the third set document direction accepting key being configured to accept a setting for any one of set-document directions in three directions other than the set text-document direction, as a setting for the set non-text document direction.

* * * * *